(12) United States Patent
Scheuermann

(10) Patent No.: US 8,018,463 B2
(45) Date of Patent: *Sep. 13, 2011

(54) PROCESSOR FOR VIDEO DATA

(75) Inventor: W. James Scheuermann, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 11/125,852

(22) Filed: May 9, 2005

(65) Prior Publication Data

US 2007/0200857 A1     Aug. 30, 2007

Related U.S. Application Data

(60) Provisional application No. 60/570,087, filed on May 10, 2004.

(51) Int. Cl.
    *G06F 15/16*     (2006.01)
    *G06K 9/36*     (2006.01)

(52) U.S. Cl. ........................................ 345/502; 382/236

(58) Field of Classification Search .................. 345/302, 345/327, 502; 348/390, 413.1, 415.1, 416.1, 348/443, 447, 449, 699, 700; 375/240.16, 375/240.18, 240.24, 240.29; 382/109, 111, 382/236, 238, 243, 248

See application file for complete search history.

(56) References Cited

U.S. PATENT DOCUMENTS

| | | | |
|---|---|---|---|
| 5,574,504 A * | 11/1996 | Yagasaki et al. ......... | 375/240.13 |
| 5,646,618 A | 7/1997 | Walsh | |
| 5,903,674 A * | 5/1999 | Ooi ............................ | 382/238 |
| 5,943,242 A | 8/1999 | Vorbach et al. | |
| 5,973,742 A | 10/1999 | Gardyne et al. | |
| 5,987,178 A * | 11/1999 | Anesko et al. ............ | 382/236 |
| 6,021,490 A | 2/2000 | Vorbach et al. | |
| 6,041,078 A | 3/2000 | Rao | |
| 6,081,903 A | 6/2000 | Vorbach et al. | |
| 6,119,181 A | 9/2000 | Vorbach et al. | |
| 6,295,089 B1 * | 9/2001 | Hoang ...................... | 348/390.1 |

(Continued)

FOREIGN PATENT DOCUMENTS

JP     2003-009149     10/2003

(Continued)

OTHER PUBLICATIONS

English Translation of JP 2004-046499 (provided as explanation of relevance of JP 2004-046499).

(Continued)

*Primary Examiner* — Amare Mengistu
*Assistant Examiner* — Aaron M Guertin
(74) *Attorney, Agent, or Firm* — Patterson & Sheridan, LLP

(57) ABSTRACT

A video processor according to the invention is dynamically configurable as to the attributes of the video data upon which the processor operates. Some embodiments dynamically configure the processor via a sequence of instructions, where the instructions include information on the attributes of the current video data. Some embodiments include a dynamically configurable adder array that computes difference functions thereby generating error vectors. Some embodiments include a dynamically configurable adder array that computes filtering functions applied to the video data, e.g. interpolation or decimation of the incoming video prior to motion detection. Some embodiments of the invention provide dynamically configurable hardware searches, for example, for detecting motion. Some embodiments of the invention are implemented using an adaptive computing machines (ACMs). An ACM includes a plurality of heterogeneous computational elements, each coupled to an interconnection network.

4 Claims, 44 Drawing Sheets

U.S. PATENT DOCUMENTS

| | | | |
|---|---|---|---|
| 6,338,106 B1 | 1/2002 | Vorbach et al. | |
| 6,404,815 B1 * | 6/2002 | Sekiguchi et al. | 375/240.16 |
| 6,405,299 B1 | 6/2002 | Vorbach et al. | |
| 6,425,068 B1 | 7/2002 | Vorbach et al. | |
| 6,480,937 B1 | 11/2002 | Vorbach et al. | |
| 6,542,998 B1 | 4/2003 | Vorbach et al. | |
| 6,571,381 B1 | 5/2003 | Vorbach et al. | |
| 6,697,979 B1 | 2/2004 | Vorbach et al. | |
| 6,968,008 B1 * | 11/2005 | Ribas-Corbera et al. | 375/240.16 |
| 7,003,660 B2 | 2/2006 | Vorbach et al. | |
| 7,103,226 B1 * | 9/2006 | Frank et al. | 382/254 |
| 7,210,129 B2 | 4/2007 | May et al. | |
| 7,266,725 B2 | 9/2007 | Vorbach et al. | |
| 7,394,284 B2 | 7/2008 | Vorbach | |
| 7,434,191 B2 | 10/2008 | Vorbach et al. | |
| 7,444,531 B2 | 10/2008 | Vorbach et al. | |
| 2004/0131267 A1 * | 7/2004 | Adiletta et al. | 382/236 |
| 2005/0027970 A1 * | 2/2005 | Arnold et al. | 712/226 |
| 2005/0206784 A1 * | 9/2005 | Li et al. | 348/441 |

FOREIGN PATENT DOCUMENTS

| | | |
|---|---|---|
| JP | 2004-046499 | 2/2004 |

OTHER PUBLICATIONS

Bose, et al. "A Single Chip Multistandard Video Codec," IEEE 1993 Custom Integrated Circuits Conference, 1993.

Lin, et al. "A 14-gops Programmable Motion Estimator for H.26X Video Coding," IEEE Journal of Solid-State Circuits, vol. 31, No. 11, Nov. 1996.

Khawam, et al. "Embedded Reconfigurable Array Targeting Motion Estimation Applications," Circuits and Systems, ISCAS 2003.

English translation of JP 2003-009149, provided as explanation of relevance.

* cited by examiner

|   | NEXT STATE | | | | | |
|---|---|---|---|---|---|---|
| CURRENT STATE | 0 0 0<br>idle | 0 0 1<br>execute | 0 1 0<br>wait | 1 0 0<br>setup | 1 0 1<br>ack+test | 1 1 1<br>continue |
| 0 0 0<br>idle | idle | | | wrapper asserts eu_run | | |
| 0 0 1<br>execute | | execute | | | algorithm terminal count indicates done | |
| 0 1 0<br>wait | wrapper asserts eu_teardown | | wait | | | wrapper asserts eu_continue |
| 1 0 0<br>setup | | setup byte code indicates done | | setup | | |
| 1 0 1<br>ack+test | ack+test byte code indicates teardown | ack+test byte code indicates execute | ack+test byte code indicates ack+test | | ack+test | ack+test byte code indicates continue |
| 1 1 1<br>continue | | continue byte code indicates done | | | | continue |

Note: Wrapper signals 'not_node_enabled' OR 'eu_abort' force STATE to '0 0 0', IDLE

DVN FSM STATE TRANSITION TABLE

Figure 14

WCSZ     stall while sign of counter is '0'

| 7 | 6 | 5 | 4 | 3 | 2 | 1 | 0 |
|---|---|---|---|---|---|---|---|
| 0 | 1 | 1 | 0 | 1 | 0 | 0 | 0 |

Operation: for sign (msb) of counter @ eu_csar[5:0] = '0' | '1', stall | continue

WCSO     stall while sign of counter is '1'

| 7 | 6 | 5 | 4 | 3 | 2 | 1 | 0 |
|---|---|---|---|---|---|---|---|
| 0 | 1 | 1 | 0 | 1 | 0 | 0 | 1 |

Operation: for sign (msb) of counter @ eu_csar[5:0] = '1' | '0', stall | continue

WMSZ     stall while sign of tpl memory is '0'

| 7 | 6 | 5 | 4 | 3 | 2 | 1 | 0 |
|---|---|---|---|---|---|---|---|
| 0 | 1 | 1 | 0 | 1 | 0 | 1 | 0 |

Operation: for sign (msb) of tpl longword @ tpl_offset = '0' | '1', stall | continue

WMSO     stall while sign of tpl memory is '1'

| 7 | 6 | 5 | 4 | 3 | 2 | 1 | 0 |
|---|---|---|---|---|---|---|---|
| 0 | 1 | 1 | 0 | 1 | 0 | 1 | 1 |

Operation: for sign (msb) of tpl longword @ tpl_offset = '1' | '0', stall | continue

DVN BYTE CODES FOR ACKNOWLEDGE+TEST

Figure 21A

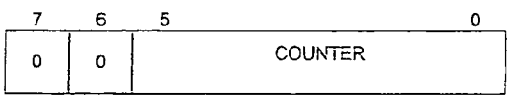
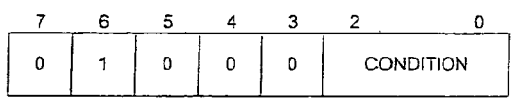
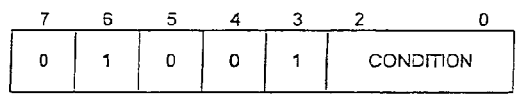
Figure 21B

CSTC     conditional state transition to CONTINUE

| 7 | 6 | 5 | 4 | 3 | 2             0 |
|---|---|---|---|---|---|
| 0 | 1 | 0 | 1 | 0 | CONDITION |

If TRUE: Operation: FSM STATE <—CONTINUE; else NOP

| CODE[2:0] | CONDITION |
|---|---|
| 0 0 0 | unconditional |
| 0 0 1 | uncond; wrapper cntr sign selects parms offset |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

CSTI     conditional state transition to IDLE, set DONE

| 7 | 6 | 5 | 4 | 3 | 2             0 |
|---|---|---|---|---|---|
| 0 | 1 | 0 | 1 | 1 | CONDITION |

If TRUE: Operation: FSM STATE <—IDLE, assert 'eu_done'; else NOP

| CODE[2:0] | CONDITION |
|---|---|
| 0 0 0 | unconditional |
| 0 0 1 | unconditional |
| 0 1 0 | wrapper counter sign is '0' |
| 0 1 1 | wrapper counter sign is '1' |
| 1 0 0 | d_cntr[5:0] msb is '0' |
| 1 0 1 | d_cntr[5:0] msb is '1' |
| 1 1 0 | sign (msb) of tpl longword @ tpl_offset is '0' |
| 1 1 1 | sign (msb) of tpl longword @ tpl_offset is '1' |

DVN BYTE CODES FOR ACKNOWLEDGE+TEST

Figure 21C

| CSM1 | clear semaphore 1 |
|---|---|

| 7 | 6 | 5 | 4 | 3 | 2 | 1 | 0 |
|---|---|---|---|---|---|---|---|
| 0 | 1 | 1 | 0 | 1 | 1 | 0 | 0 |

Operation: Contents of address [TPL pointer + 4] <-- 0x00000000

| CSM2 | clear semaphore 2 |
|---|---|

| 7 | 6 | 5 | 4 | 3 | 2 | 1 | 0 |
|---|---|---|---|---|---|---|---|
| 0 | 1 | 1 | 0 | 1 | 1 | 0 | 1 |

Operation: Contents of address [TPL pointer + 5] <-- 0x00000000

| SSM1 | set semaphore 1 |
|---|---|

| 7 | 6 | 5 | 4 | 3 | 2 | 1 | 0 |
|---|---|---|---|---|---|---|---|
| 0 | 1 | 1 | 0 | 1 | 1 | 1 | 0 |

Operation: Contents of address [TPL pointer + 4] <-- 0x80000000

| SSM2 | set semaphore 2 |
|---|---|

| 7 | 6 | 5 | 4 | 3 | 2 | 1 | 0 |
|---|---|---|---|---|---|---|---|
| 0 | 1 | 1 | 0 | 1 | 1 | 1 | 1 |

Operation: Contents of address [TPL pointer + 5] <-- 0x80000000

DVN BYTE CODES FOR ACKNOWLEDGE+TEST

Figure 21D

ACK0        acknowledgement

| 7 | 6 | 5 | 4 | 3 | 2 | 1 | 0 |
|---|---|---|---|---|---|---|---|
| 0 | 1 | 1 | 1 | 0 | 0 | 0 | 0 |

Operation: Send contents of address [TPL pointer + offset] to network with Aux <–0x00

ACK1        acknowledgement + test

| 7 | 6 | 5 | 4 | 3 | 2 | 1 | 0 |
|---|---|---|---|---|---|---|---|
| 0 | 1 | 1 | 1 | 0 | 0 | 0 | 1 |

Operation: Send contents of address [TPL pointer + offset] to network with Aux <–0x01

ACK2        initialize counter

| 7 | 6 | 5 | 4 | 3 | 2 | 1 | 0 |
|---|---|---|---|---|---|---|---|
| 0 | 1 | 1 | 1 | 0 | 0 | 1 | 0 |

Operation: Send contents of address [TPL pointer + offset] to network with Aux <–0x02

ACK3        increment counter

| 7 | 6 | 5 | 4 | 3 | 2 | 1 | 0 |
|---|---|---|---|---|---|---|---|
| 0 | 1 | 1 | 1 | 0 | 0 | 1 | 1 |

Operation: Send contents of address [TPL pointer + offset] to network with Aux <–0x03

DVN BYTE CODES FOR ACKNOWLEDGE+TEST

Figure 21E

| TPL POINTER OFFSET | 31 | 0 | |
|---|---|---|---|
| 0x00 | SETUP CODE STARTING ADDRESS (CSA) AND PARMS OFFSET = 0x8 | | ← TPL POINTER |
| 0x01 | ACK+TEST CODE STARTING ADDRESS (CSA+1) AND PARMS OFFSET = 0xA | | |
| 0x02 | TEARDOWN CODE STARTING ADDRESS (not used) | | |
| 0x03 | CONTINUE CODE STARTING ADDRESS (CSA+4) AND PARMS OFFSETS = 0x0F, 0x12 | | |
| 0x04 | SEMAPHORE 1 (not used) | | |
| 0x05 | SEMAPHORE 2 (not used) | | |
| 0x06 | reserved | | |
| 0x07 | reserved | | ← SETUP OFFSET |
| 0x08 | CSR PARAMETERS | | |
| 0x09 | CNLR PARAMETERS | | |
| 0x0A | DNLR PARAMETERS | | ← ACK+TEST OFFSET |
| 0x0B | PRODUCER ACKNOWLEDGEMENT PARAMETERS | | |
| 0x0C | PRODUCER SELF-ACK PARAMETERS | | |
| 0x0D | CONSUMER ACKNOWLEDGEMENT PARAMETERS | | |
| 0x0E | CONSUMER SELF-ACK PARAMETERS | | ← CONTINUE(0) OFFSET |
| 0x0F | CSR(0) PARAMETERS | | |
| 0x10 | CNLR(0) PARAMETERS | | |
| 0x11 | DNLR(0) PARAMETERS | | ← CONTINUE(1) OFFSET |
| 0x12 | CSR(1) PARAMETERS | | |
| 0x13 | CNLR(1) PARAMETERS | | |
| 0x14 | DNLR(1) PARAMETERS | | |

TASK PARAMETER LIST: 18 LONGWORDS

| 31 | 24 23 | 16 15 | 8 7 | 0 | | |
|---|---|---|---|---|---|---|
| - | LD DNLR,DONE | LD CNLR | LD CSR | | ← CSA | (SETUP) |
| ACK0 | ACK0 | ACK0 | ACK0 | | ← CSA+1 | (ACK+TEST) |
| WCSO | LDCA (OUT) | WCSZ | LDCA (IN) | | | |
| - | - | CSTC-001 | LDCA (FLAG) | | | |
| - | LD DNLR,DONE | LD CNLR | LD CSR | | ← CSA+4 | (CONTINUE) |

BYTE CODE: 5 LONGWORDS

DVN TASK PARAMETER LIST (TPL) AND BYTE CODE FOR 'TYPICAL TASK'

Figure 22

```
31 30    27 26                                                                    0
| V | COMMAND |                    PARAMETERS                                     |
                    DVN COMMAND BUFFER FORMAT 31 30    27 26                                        15 14      8 7 6 5          0
| 1 | 0 0 0 0 |         RESERVED            | - |  X LOCATION  | - |  Y LOCATION  |
          COMMAND 0x0:  DETERMINE METRIC FOR ONE POSITION (X, Y)

31 30    27 26   24 23       19 18    16 15 14       8 7 6 5                      0
| 1 | 0 0 0 1 | m (H) |   RESERVED   | n (V) | - | X LOCATION | - | Y LOCATION |
       COMMAND 0x1:  DETERMINE BEST METRIC FOR m-by-n 5 x 5 SETS OF POSITIONS (X, Y)

31 30    27 26 25 24 23            16 15 14       8 7 6 5                         0
| 1 | 0 0 1 0 | - | M | S |   RESERVED   | - | X LOCATION | - | Y LOCATION |
          COMMAND 0x2:  FULL PEL TO HALF PEL INTERPOLATION 31 30    27 26 25 24 23                        12 11                              0
| 1 | 0 0 1 1 | - | M | S |       RESERVED       |   HALF PEL BUFFER LOCATION     |
          COMMAND 0x3:  HALF PEL TO QUARTER PEL INTERPOLATION 31 30    27 26 25 24                16 15 14       8 7 6 5                        0
| 1 | 0 1 0 0 | D | M |   RESERVED   | - | X LOCATION | - | Y LOCATION |
          COMMAND 0x4:  FULL PEL SIGNED DIFFERENCES 31 30    27 26 25 24                           12 11                              0
| 1 | 0 1 0 1 | D | M |       RESERVED        |   HALF PEL BUFFER LOCATION        |
          COMMAND 0x5:  HALF PEL SIGNED DIFFERENCES 31 30    27 26 25 24                           12 11                              0
| 1 | 0 1 1 0 | D | M |       RESERVED        |  QUARTER PEL BUFFER LOCATION      |
          COMMAND 0x6:  QUARTER PEL SIGNED DIFFERENCES 31 30    27 26 25 24                16 15 14       8 7 6 5                        0
| 1 | 0 1 1 1 | D | M |   RESERVED   | - | X LOCATION | - | Y LOCATION |
          COMMAND 0x7:  OUTPUT FULL PEL MACROBLOCK 31 30    27 26 25 24                           12 11                              0
| 1 | 1 0 0 0 | D | M |       RESERVED        |   HALF PEL BUFFER LOCATION        |
          COMMAND 0x8:  OUTPUT HALF PEL MACROBLOCK 31 30    27 26 25 24                           12 11                              0
| 1 | 1 0 0 1 | D | M |       RESERVED        |  QUARTER PEL BUFFER LOCATION      |
          COMMAND 0x9:  OUTPUT QUARTER PEL MACROBLOCK 31 30    27 26 25                                                                 0
| 1 | 1 0 1 0 | D | M |                    RESERVED                               |
          COMMAND 0xA:  OUTPUT BEST METRIC 31 30    27 26 25                                                                 0
| 1 | 1 0 1 1 | D | M |                    RESERVED                               |
          COMMAND 0xB:  OUTPUT MOTION VECTOR 31 30    27 26                                                                    0
| 1 | 1 1 0 0 |                      RESERVED                                     |
          COMMAND 0xC:  DONE 31 30    27 26                                                                    0
| 1 | 1 1 1 1 |                   ANY BIT PATTERN                                 |
          COMMAND 0xF:  ECHO

DVN COMMAND BUFFER DATA STRUCTURES
```

Figure 24

| 31 | | | 0 |
|---|---|---|---|
| | STATUS | | |

DVN TO CONTROLLER STATUS WORD FORMAT

| 31 | 24 | 23 | 16 | 15 | 0 |
|---|---|---|---|---|---|
| X LOCATION | | Y LOCATION | | FULL PEL METRIC | |

STATUS WORD FOR COMMAND 0x0: DETERMINE METRIC FOR ONE POSITION (X, Y)

| 31 | 24 | 23 | 16 | 15 | 0 |
|---|---|---|---|---|---|
| X LOCATION | | Y LOCATION | | BEST FULL METRIC METRIC | |

STATUS WORD FOR COMMAND 0x1: DETERMINE BEST METRIC FOR m-by-n 5 x 5 SETS OF POSITIONS (X, Y)

| 31 | 20 | 19 | 16 | 15 | 0 |
|---|---|---|---|---|---|
| | | CANDIDATE | | METRIC | |

STATUS WORD FOR COMMAND 0x2: FULL PEL TO HALF PEL INTERPOLATION

| 31 | 20 | 19 | 16 | 15 | 0 |
|---|---|---|---|---|---|
| | | CANDIDATE | | METRIC | |

STATUS WORD FOR COMMAND 0x3: HALF PEL TO QUARTER PEL INTERPOLATION

| 31 | 0 |
|---|---|
| 0xFF010000 | |

STATUS WORD FOR COMMAND 0x4: FULL PEL SIGNED DIFFERENCES

| 31 | 0 |
|---|---|
| 0xFF020000 | |

STATUS WORD FOR COMMAND 0x5: HALF PEL SIGNED DIFFERENCES

| 31 | 0 |
|---|---|
| 0xFF040000 | |

STATUS WORD FOR COMMAND 0x6: QUARTER PEL SIGNED DIFFERENCES

| 31 | 0 |
|---|---|
| 0xFF080000 | |

STATUS WORD FOR COMMAND 0x7: OUTPUT FULL PEL MACROBLOCK

| 31 | 0 |
|---|---|
| 0xFF100000 | |

STATUS WORD FOR COMMAND 0x8: OUTPUT HALF PEL MACROBLOCK

| 31 | 0 |
|---|---|
| 0xFF200000 | |

STATUS WORD FOR COMMAND 0x9: OUTPUT QUARTER PEL MACROBLOCK

| 31 | 15 | 0 |
|---|---|---|
| | METRIC | |

STATUS WORD FOR COMMAND 0xA: OUTPUT BEST METRIC

| 31 | 25 | 24 | 16 | 15 | 8 | 7 | 0 |
|---|---|---|---|---|---|---|---|
| | HORIZONTAL: 0 to 79-3/4 | | | | VERTICAL: 0 to 49-3/4 | | |

STATUS WORD FOR COMMAND 0xB: OUTPUT QUARTER PEL RESOLUTION MOTION VECTOR

| 31 | 0 |
|---|---|
| 0xFF400000 | |

STATUS WORD FOR COMMAND 0xC: DONE

| 31 | 0 |
|---|---|
| STATUS[31:0] == COMMAND[31:0] | |

STATUS WORD FOR COMMAND 0xF: ECHO

| 31 | 0 |
|---|---|
| 0xFF800000 | |

STATUS WORD IN RESPONSE TO COMMAND QUEUE REDIRECTION

DVN TO CONTROLLER STATUS WORD FORMATS

Figure 25

| | | | | HORIZONTAL SEARCH | | | | | | | | | | | | | | |
|---|---|---|---|---|---|---|---|---|---|---|---|---|---|---|---|---|---|---|
| | m (x5) sets | | | 1 | 2 | 3 | 4 | 5 | 6 | 7 | 8 | 9 | 10 | 11 | 12 | 13 | 14 | 15 | 16 |
| | | search range | | 5 | 10 | 15 | 20 | 25 | 30 | 35 | 40 | 45 | 50 | 55 | 60 | 65 | 70 | 75 | 80 |
| n (x5) sets | search range | | columns | 20 | 25 | 30 | 35 | 40 | 45 | 50 | 55 | 60 | 65 | 70 | 75 | 80 | 85 | 90 | 95 |
| | | rows | longwords | 5 | 7 | 8 | 9 | 10 | 12 | 13 | 14 | 15 | 17 | 18 | 19 | 20 | 22 | 23 | 24 |
| 1 | 5 | 20 | 5 | 25 (40) | 35 (80) | 40 (120) | 45 (160) | 50 (200) | 60 (240) | 65 (280) | 70 (320) | 75 (360) | 85 (400) | 90 (440) | 95 (480) | 100 (520) | 110 (560) | 115 (600) | 120 (640) |
| 2 | 10 | 25 | 7 | 35 (80) | 49 (160) | 56 (240) | 63 (320) | 70 (400) | 84 (480) | 91 (560) | 98 (640) | 105 (720) | 119 (800) | 126 (880) | 133 (960) | 140 (1040) | 154 (1120) | 161 (1200) | 168 (1280) |
| 3 | 15 | 30 | 8 | 40 (120) | 56 (240) | 64 (360) | 72 (480) | 80 (600) | 96 (720) | 104 (840) | 112 (960) | 120 (1080) | 136 (1200) | 144 (1320) | 152 (1440) | 160 (1560) | 176 (1680) | 184 (1800) | 192 (1920) |
| 4 | 20 | 35 | 9 | 45 (160) | 63 (320) | 72 (480) | 81 (640) | 90 (800) | 108 (960) | 117 (1120) | 126 (1280) | 135 (1440) | 153 (1600) | 162 (1760) | 171 (1920) | 180 (2080) | 198 (2240) | 207 (2400) | 216 (2560) |
| 5 | 25 | 40 | 10 | 50 (200) | 70 (400) | 80 (600) | 90 (800) | 100 (1000) | 120 (1200) | 130 (1400) | 140 (1600) | 150 (1800) | 170 (2000) | 180 (2200) | 190 (2400) | 200 (2600) | 220 (2800) | 230 (3000) | 240 (3200) |
| 6 | 30 | 45 | 12 | 60 (240) | 84 (480) | 96 (720) | 108 (960) | 120 (1200) | 144 (1440) | 156 (1680) | 168 (1920) | 180 (2160) | 204 (2400) | 216 (2640) | 228 (2880) | 240 (3120) | *__264__* (3360) | *__276__* (3600) | *__288__* (3840) |
| 7 | 35 | 50 | 13 | 65 (280) | 91 (560) | 104 (840) | 117 (1120) | 130 (1400) | 156 (1680) | 169 (1960) | 182 (2240) | 195 (2520) | 221 (2800) | 234 (3080) | *__247__* (3360) | *__260__* (3640) | *__286__* (3920) | *__299__* (4200) | *__312__* (4480) |
| 8 | 40 | 55 | 14 | 70 (320) | 98 (640) | 112 (960) | 126 (1280) | 140 (1600) | 168 (1920) | 182 (2240) | 196 (2560) | 210 (2880) | 238 (3200) | *__252__* (3520) | *__266__* (3840) | *__280__* (4160) | *__308__* (4480) | *__322__* (4800) | *__336__* (5120) |
| 9 | 45 | 60 | 15 | 75 (360) | 105 (720) | 120 (1080) | 135 (1440) | 150 (1800) | 180 (2160) | 195 (2520) | 210 (2880) | 225 (3240) | *__255__* (3600) | *__270__* (3960) | *__285__* (4320) | *__300__* (4680) | *__330__* (5040) | *__345__* (5400) | *__360__* (5760) |
| 10 | 50 | 65 | 17 | 85 (400) | 119 (800) | 136 (1200) | 153 (1600) | 170 (2000) | 204 (2400) | 221 (2800) | 238 (3200) | *__255__* (3600) | *__289__* (4000) | *__306__* (4400) | *__323__* (4800) | *__340__* (5200) | *__374__* (5600) | *__391__* (6000) | *__408__* (6400) |

NOTES:
1) SINGLE MEMORY MAXIMUM CAPACITY FOR REFERENCE BLOCK IS 240 LONGWORDS (bold-italics-underlined NOT SUPPORTED)
2) AVG. NO. OF PROCESSING CYCLES AVAILABLE FOR D1, 30 FRAMES PER SECOND, AND 200 MHz DVN CLOCK FREQUENCY= 4938.

REFERENCE BLOCK LWORDS per MEMORY (AND CLOCK CYCLES) for m-by-n 5x5 SEARCH RANGES

Figure 26

PROCESSOR FOR VIDEO DATA

REFERENCE TO RELATED APPLICATIONS

This application claims priority from the following: Provisional U.S. patent application Ser. No. 60/570,087 "Digital Video Node for An Adaptive Computing Machine", by Master et al.; U.S. Patent Publication No. 2003/0115553 "Computer Processor Architecture Selectively Using Finite-State-Machine for Control Code Execution" by Master et al.; U.S. Patent Application No. 2004/0093601 "Method, System and Program for Developing And Scheduling Adaptive Integrated Circuitry and Corresponding Control or Configuration Information" by Master et al.; U.S. Patent Publication No. 2004/0177225 "External Memory Controller Node" by Master et al.; U.S. Patent Application Publication No. 2004/0181614 "Input/Output Controller Node in an Adaptable Computing Environment" by Master et all.

These applications are incorporated herein by reference for all purposes, as is U.S. Pat. No. 6,836,839 "Adaptive Integrated Circuitry with Heterogeneous and Reconfigurable Matrices of Diverse and Adaptive Computational Units Having Fixed, Application Specific Computational Elements" by Master et al.

BACKGROUND OF THE INVENTION

Video information is ubiquitous in today's world. Children learn from television shows and educational lesions prepared for video. Adults use video for entertainment and to keep informed with current events. Digital versatile disks (DVDs), digital cable, and satellite television use digital video data, in contrast to the older analog mechanisms for recording and distributing video information. Digital video data is becoming more and more prevalent in today's home and office environment.

The amount of numeric computation involved in processing digital video data requires an enormous amount of computational power. Generating digital video data of typical quality for one second's worth of video requires performing between tens of millions and a billion arithmetic computations.

Hardware can be used to speed up video computations, compared with software encoders, decoders, and transcoders for digital video data. However, typical approaches to hardware design operate only with video data in one particular format at one particular resolution. Thus there is a need for hardware that works with video data of different resolutions, standards, formats, etc.

SUMMARY OF EMBODIMENTS OF THE INVENTION

Various embodiments of the invention provide systems and methods for processing video data. In a preferred embodiment, a video processor is configured at run time so as to operate on video data having various attributes. These streams can have various combinations of attributes, including format, standardization, resolution, encoding, compression, or other attributes. The video processor operates on the various streams of video data according to a dynamic control mechanism including, but not limited to, a program or dynamically configurable values held in a register.

Some embodiments of the invention provide a video processor that can be dynamically configured via a sequence of instructions, where the instructions include information on the attributes of the current video data. This information configures the video processor to receive video data with specified attributes, to generate video data with specified attributes, or both.

The operation of the video processor is controlled by at least one sequence of instructions. Multiple sequences may be employed concurrently, thereby enabling the processor to concurrently generate and/or receive video streams of different attributes.

In some embodiments of the invention, one or more control processors provide the instruction sequences to the video processor. The control processors and the video processor are adapted to operate together as coprocessors. Alternatively or additionally, the instruction sequences may be stored in one or more instruction memories or queues associated with the video processor.

Some embodiments of the invention provide an adder array that can be dynamically configured via control mechanisms including but not limited to instructions, register values, control signals, or programmable links. As the processor sends video data through the adder array, the array generates the numerical, logical, or sequential computational results required to process the video data.

Adder arrays are used, in some embodiments of the invention, to compute difference functions and thereby generate error vectors. Error vectors may be used to detect motion among sets of video data that are temporally related. Error vectors may also be used to compute residual data that is encoded in the output video.

Adder arrays are also used, in some embodiments of the invention, to compute filtering functions that are applied to the video data. Such filtering functions include, but are not limited to, interpolation or decimation of the incoming video prior to motion detection.

Decimated or interpolated PELs may be used to generate output video having different attributes than the input video. Alternatively or additionally, decimated or interpolated PELs that persist only during an encoding or compressing process may be used to increase the accuracy or perceived quality of the output video. Such uses include but are not limited to: hierarchical techniques to increase the performance of motion detection based on reducing the resolution of the input video for an initial top-level motion scan; or interpolated techniques for increasing the accuracy of motion detection.

Some embodiments of the invention provide dynamically configurable hardware search operations. Such operations can be used when encoding video for various purposes, including but not limited to, detecting motion among sets of video data that are temporarily related. A single hardware operation compares a reference block within one set of video data to a set of regions within the same or a different set of video data. In addition to the attributes of the video data being dynamically configurable, the number of regions within the set and the relative offset among the various regions is dynamically configurable.

Some embodiments of the invention are implemented using adaptive computing machines (ACMs). An ACM includes a plurality of heterogeneous computational elements, each coupled to an interconnection network.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures:

FIG. 14 shows a state transition table for a finite state machine (FSM) according to an embodiment of the invention.

FIGS. 21A to 21E show formats for acknowledge+test byte codes according to an embodiment of the invention.

FIG. 22 shows formats for "typical" task TPL entries and byte codes according to an embodiment of the invention.

FIG. 24 shows formats for command buffer data structures according to an embodiment of the invention.

FIG. 25 shows formats for "to controller" status words according to an embodiment of the invention.

FIG. 26 shows formats for reference block longwords according to memory and clock cycles for M-by-N 5×5 search ranges according to an embodiment of the invention.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to receive, present, prompt, generate, yes, or no. Those skilled in the art use such terms as a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 1:
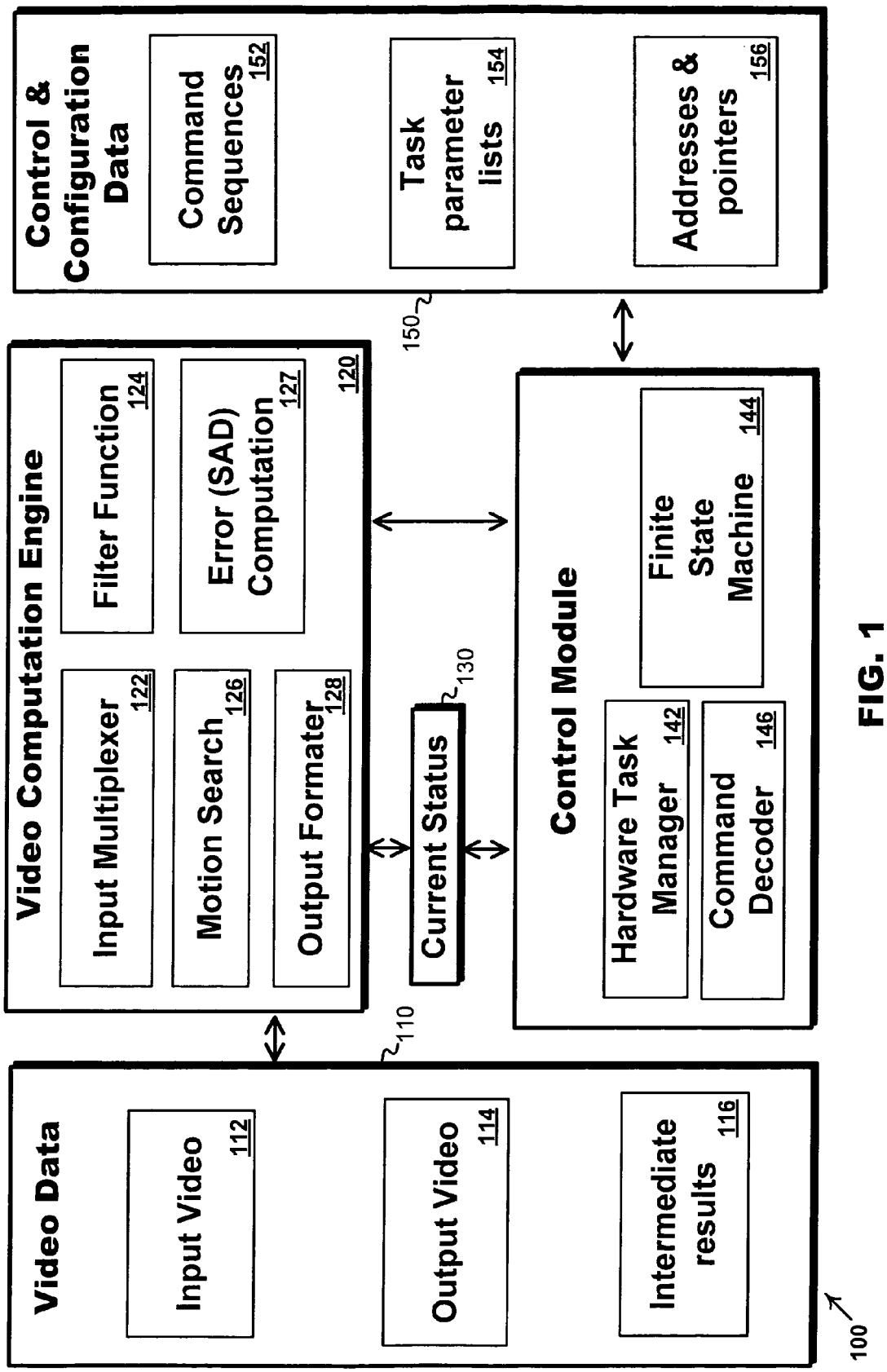
FIG. 1 shows a high level functional block diagram of a video processor according to an embodiment of the invention.

FIG. 1 is a high level functional block diagram of a video processor according to an embodiment of the invention. Video processor 100 includes one or more video data devices that hold or provide network access to video data 110, one or more video computation engines 120, one or more devices 130 that hold current status information, one or more control modules 140, and one or more control & configuration data devices 150 that hold or provide network access to control & configuration data.

Video data 110 includes, but need not be not limited to, input video data 112, output video data 114, and intermediate results 116. In various embodiments of the invention, video data 110 is held in one or more of: memory modules within the same integrated circuit as the rest of video processor 100; memory devices external to that IC; register files; or other circuitry that holds data.

Video computation engine 120 includes, but need not be limited to the following: input multiplexer 122; filter function circuit 124; motion search circuit 126; error, e.g. sum of absolute differences (SAD) computation circuit 127; and output formatter circuit 128. Video computation engine 120 receives input video data 112 and intermediate results 116, and generates intermediate results 116 and output video 114.

The processing functions and operations that video computation engine 120 applies to the data received in order to generate results 116 and 114 is controlled by control signals 146. Under the control of signals 146, various embodiments of engine 120 perform various functions including but not limited to encoding, decoding, transcoding, and motion estimation.

The attributes of video input 112, video output 114, and intermediate results 116 are specified by control signals 146. These attributes include, but need not be limited to, format, standardization, resolution, encoding, or degree of compression.

Control signals 146 are generated by control module 140 based on control & configuration data 150, and current status data 130. Control module 140 includes, but need not be limited to, a hardware task manager 142, finite state machine 144, and a command decoder 146.

Current status 130 includes, but need not be not limited to, indications that various items within video data 110 are ready to be processed, and indications that various data items within control and configuration data 150 are ready to control the processing operations that are applied to video data 110. Current status 130 implements a data flow model of computation, in that processing occurs when the video data and the control & configuration data is ready.

Control and configuration data 150 includes, but need not be not limited to, command sequences 152, task parameter lists 154, and addresses and pointers 156. Addresses and pointers 156 refer to various data items within video data 110, control and configuration data 150, or both. In various embodiments of the invention, video data 110 is held in one or more of: memory modules within the same integrated circuit as the rest of video processor 100; memory devices external to that IC; register files; or other circuits or devices that hold data.

The various components of video data 110 have various attributes, including but not limited to format, standardization, and resolution. A component within video data 110 may have a format that includes at least one of a version of MPEG-2, MPEG-4, a version of Windows media video (WMV), or a version of the International Telecommunications Union (ITU-T) standard X.264. X.264 is also known as joint video team (JVT) after the group who is leading the development of the standard. X.264 is also know as the International Standards Organization/International Electrotechnical Commission (ISO/IEC) standard Motion Picture Experts Group Layer 4 (MPEG-4) part 10. A component within video data 110 may have a resolution that includes any resolution between about one quarter CEL (as would be used, for example by a still picture taken by cell phone) and about a resolution defined by a version of high definition television (HDTV).

An adaptive computing machine (ACM) includes heterogeneous nodes that are connected by a homogeneous network. Such heterogeneous nodes include, but are not limited to domain video nodes (DVNs). Such a homogeneous network includes, but is not limited to a matrix interconnect network (MIN). Further description of some aspects of some embodiments of the invention, such the MIN and other aspects on adaptive computing machines (ACMs) are described in the patents and patent applications cited above as related applications.

The domain video node (DVN) can be implemented as a node type in an ACM, or it can be implemented in any suitable hardware and/or software design approach. For example, functions of embodiments of the invention can be designed as discrete circuitry, integrated circuits including custom, semicustom, or other; programmable gate arrays, application-specific integrated circuits (ASICs), etc. Functions may be performed by hardware, software or a combination of both, as desired. Various of the functions described herein may be used advantageously alone, or in combination or subcombination of other functions, including functions known in the prior art or yet to be developed. The DVN is a reconfigurable digital video processor that achieves a power-area-performance metric comparable to an ASIC.

In one embodiment, the DVN is included in an ACM with the additional benefit of reconfigurability, enabling it to execute a number of commonly used motion estimation algorithms that might require multiple ASICs to achieve the same functionality. However, other embodiments can implement the DVN, or parts or functions of the DVN, in any suitable manner including in a non-configurable, or partially configurable design.

Video processing includes a motion estimation step that requires considerable computational power, especially for higher frame resolutions. The Domain Video Node (DVN) is a type of an ACM node that provides for performing the motion estimation function and other video processing functions.

Figure 2:
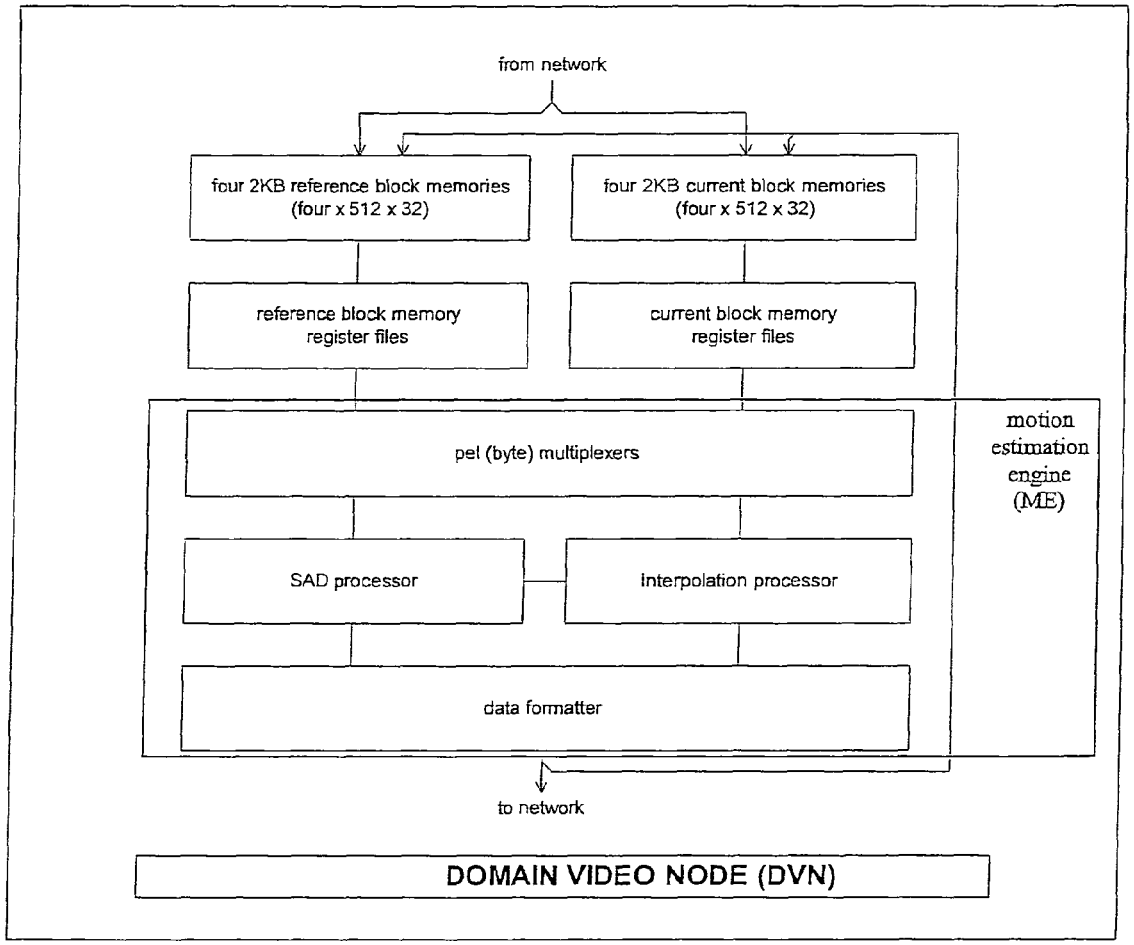
FIG. 2 shows a domain video node (DVN) according to an embodiment of the invention.

A simplified block diagram of the DVN is shown in FIG. 2. Motion estimation consists of comparing a block of picture elements (i.e. PELs) of a current frame with a block from a previous frame, a subsequent frame, or both to locate the block(s) with the lowest distortion. Such comparing can, for example, include the commonly used 'sum of absolute differences' (SAD) metric for the selection criterion.

The DVN includes eight 2 KB node memories that allow for sixteen SAD operations each clock cycle. This also allows double buffering for overlapped data input and computation/results output for 16×16 current blocks (macroblocks) and 48×48 reference blocks for search areas of +/−16 PEL in each dimension.

DVN operations include: 1) Full PEL search; 2) 18×18 full PEL to 33×33 half PEL bilinear interpolation; 3) Half PEL search; 4) Output best metric and origin of the associated 16×16 macroblock to the specified node, and output 16×16 macroblock itself to a decoder motion compensation engine.

Full PEL Search: The DVN supports two modes of operation for full PEL search. One mode evaluates each 16×16 position one at a time, performing 16 SAD operations every clock period; the second mode evaluates forty contiguous positions concurrently, performing 160 SAD operations every clock period. For both modes, evaluation consists of calculating the 'sum of absolute differences' (SAD) metric between the current 16×16 macroblock and one-of-1089

16×16 macroblocks from the 48×48 reference block, always saving the best metric and the origin of the associated 16×16 macroblock.

For each mode, the search pattern can be a number of hardwired patterns or a number of positions specified by a list of x,y coordinates (origins) generated by the node and stored in a queue located in the DVN. Various queue data structures can be used and various early completion strategies can be supported.

Figure 3:
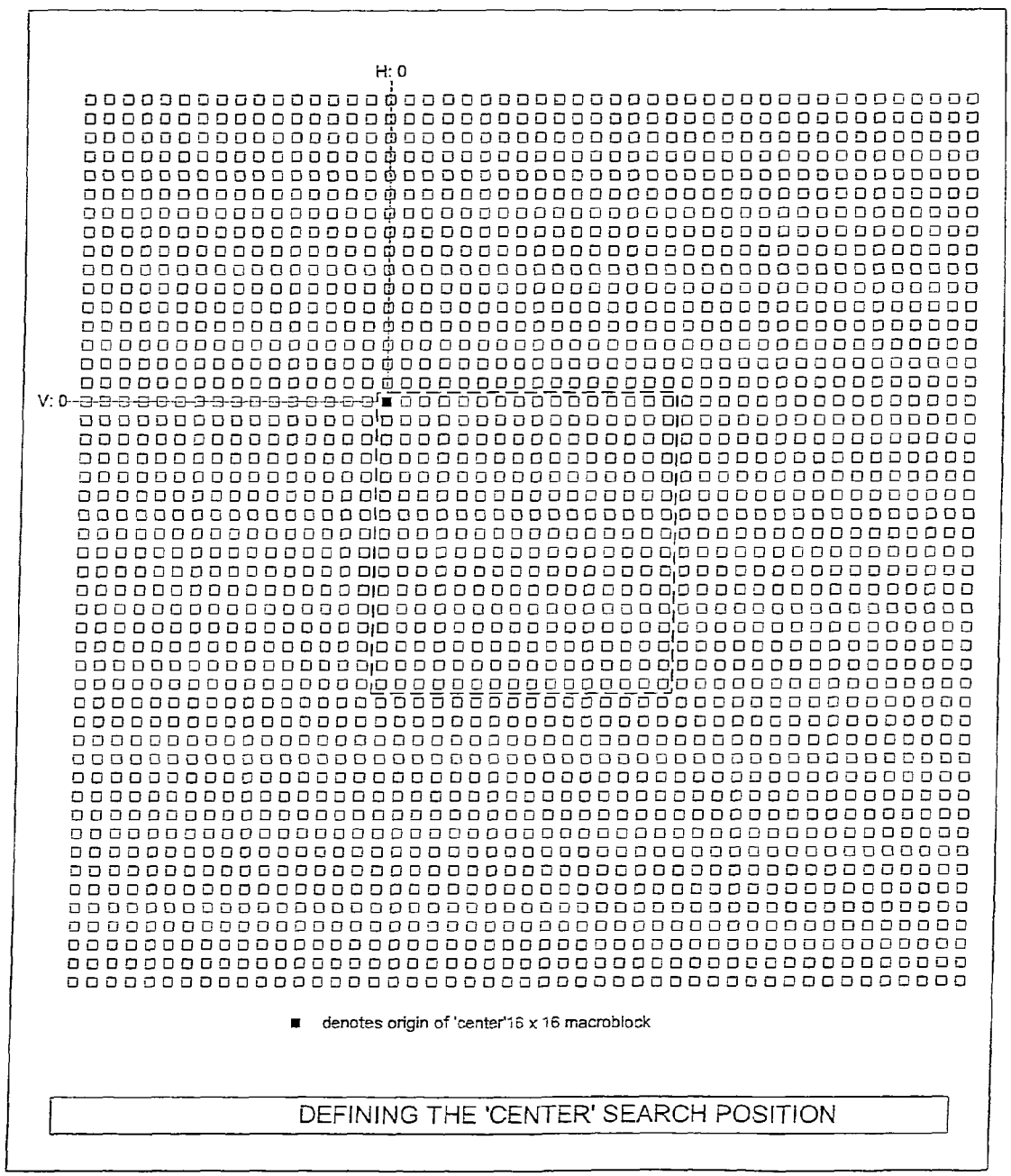
FIG. 3 shows how the center search position is defined according to an embodiment of the invention.
Figure 4:
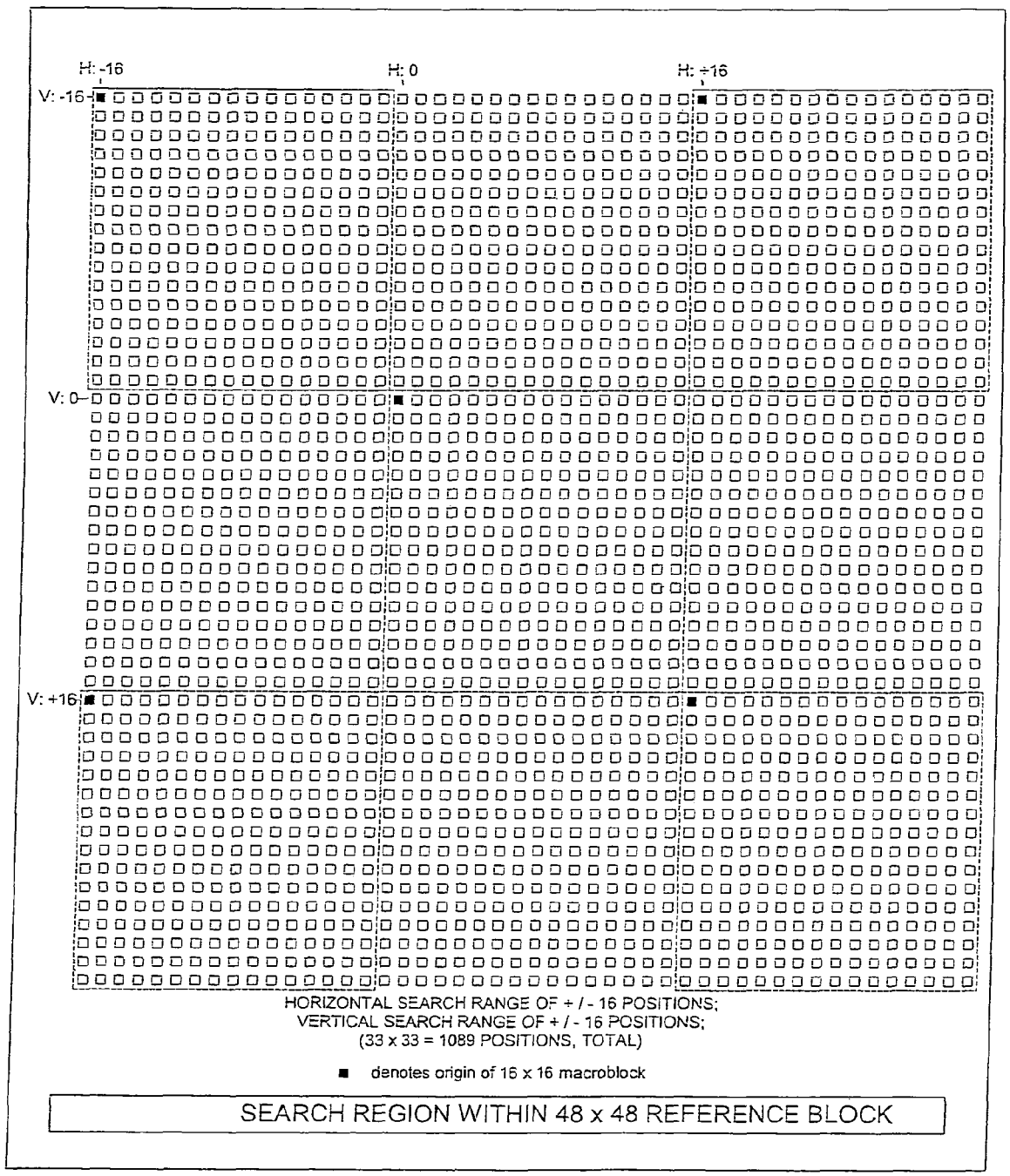
FIG. 4 shows a search region within a 48×48 reference block according to an embodiment of the invention.

There are 1089 candidate search positions within the 48×48 reference block. The 'center' position, with relative coordinates H(0), V(0), is shown in FIG. 3. Five search positions are highlighted in FIG. 4: the center position, H(0), V(0); the upper-leftmost position, H(−16), V(−16); the upper rightmost position, H(+16), V(−16); the lower leftmost position, H(−16), V(+16); and the lower rightmost position, H(+16), V(+16).

Figure 5:
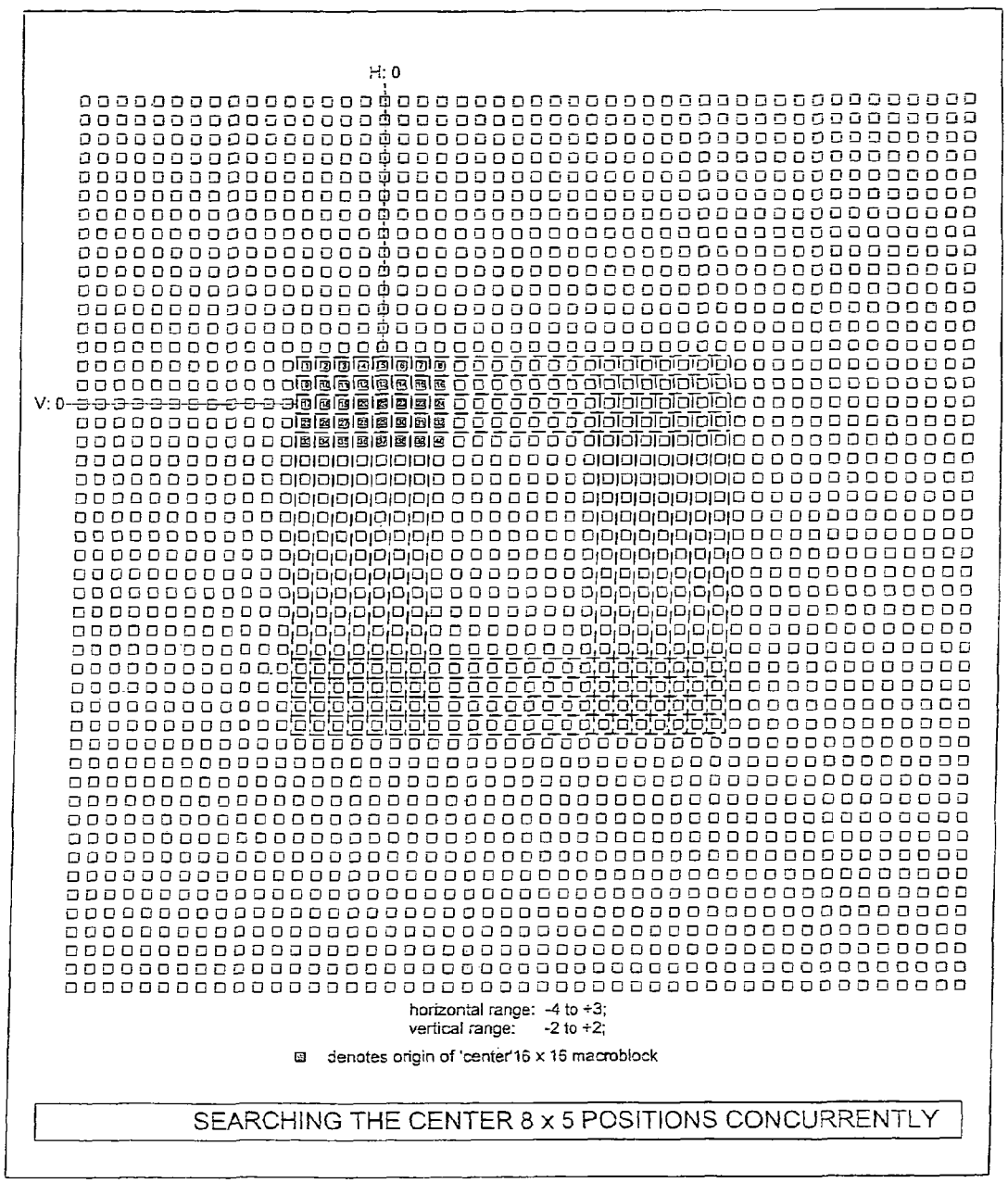
FIG. 5 shows a process of searching the center 8×5 positions concurrently according to an embodiment of the invention.

An example for searching 40 positions concurrently—the 8×5 positions at the center of the 48×48 reference block—is shown in FIG. 5.

Figure 6:
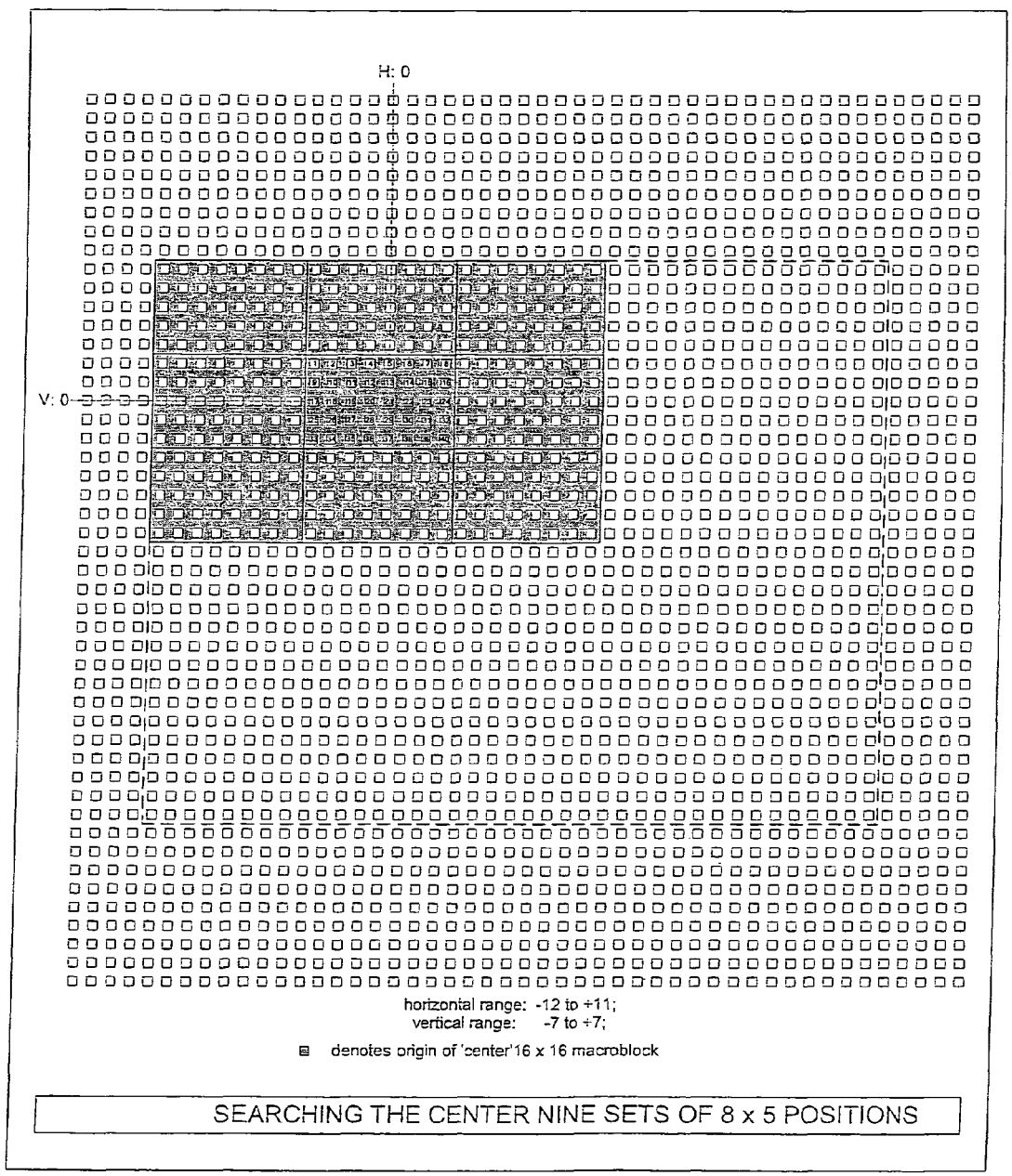
FIG. 6 shows a process of searching the center nine sets of 8×5 positions according to an embodiment of the invention.

An example for searching nine sets of 40 positions at the center of the reference block is shown in FIG. 6. The horizontal search range is −12 to +11, the vertical search range is −7 to +7, and the total number of positions searched is 360.

Figure 7:
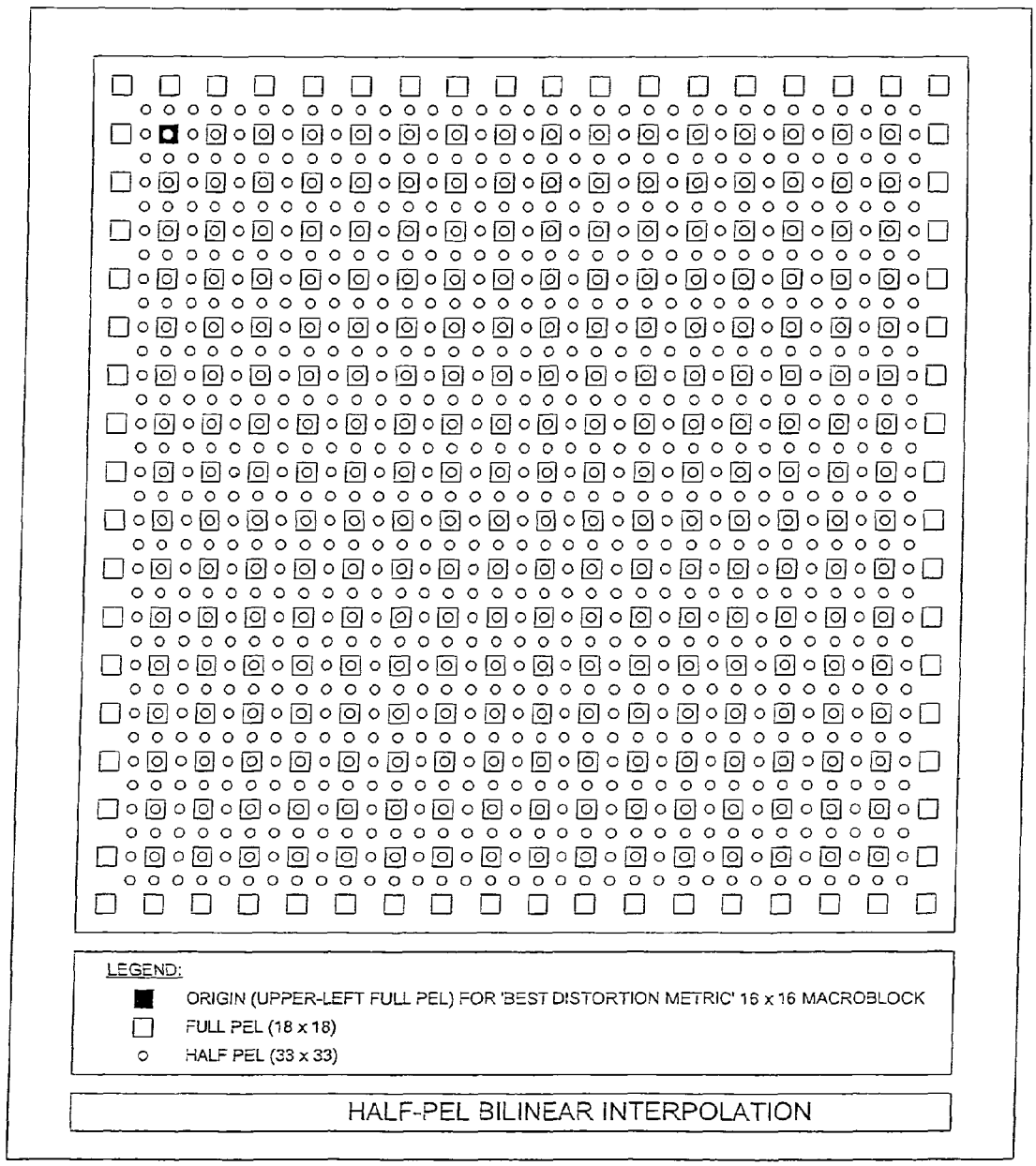
FIG. 7 shows a process of half-PEL bilinear interpolation according to an embodiment of the invention.
Figure 8:
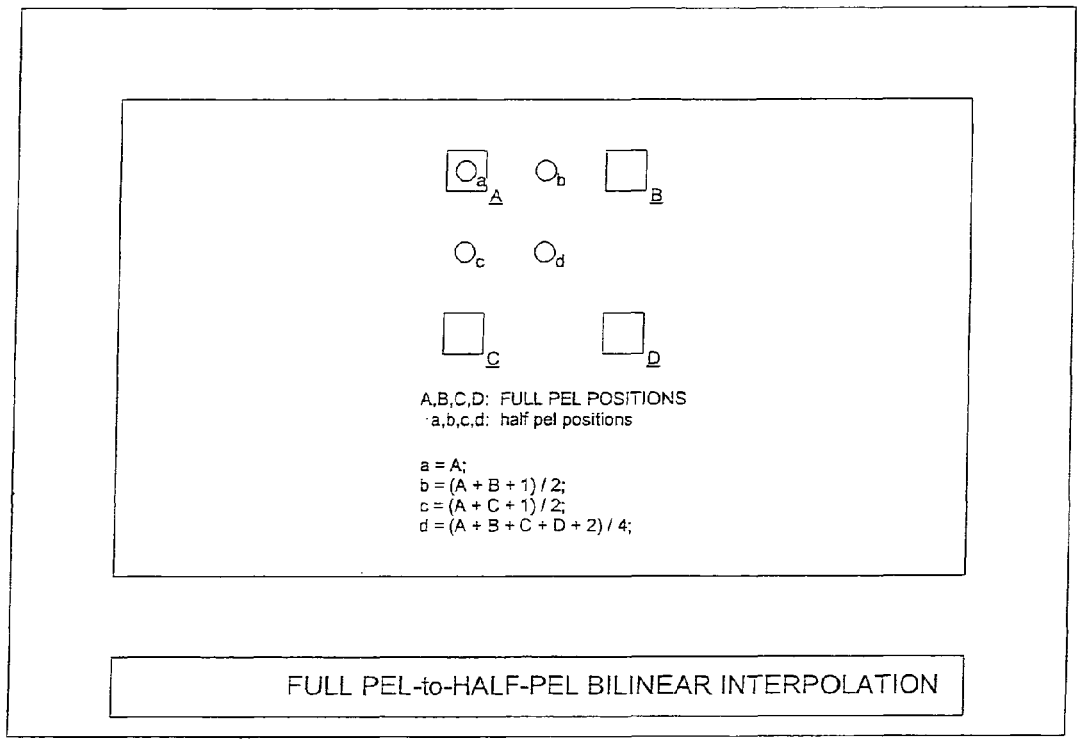
FIG. 8 shows a process of full-PEL to half-PEL bilinear interpolation according to an embodiment of the invention.

Half PEL Bilinear Interpolation: After full PEL search for the 16×16 macroblock with the best distortion metric, bilinear interpolation is performed on the surrounding 18×18 PEL array, yielding a 33×33 half PEL array, as shown in FIG. 7. Calculations used for half PEL bilinear interpolation are summarized in FIG. 8.

Figure 9:
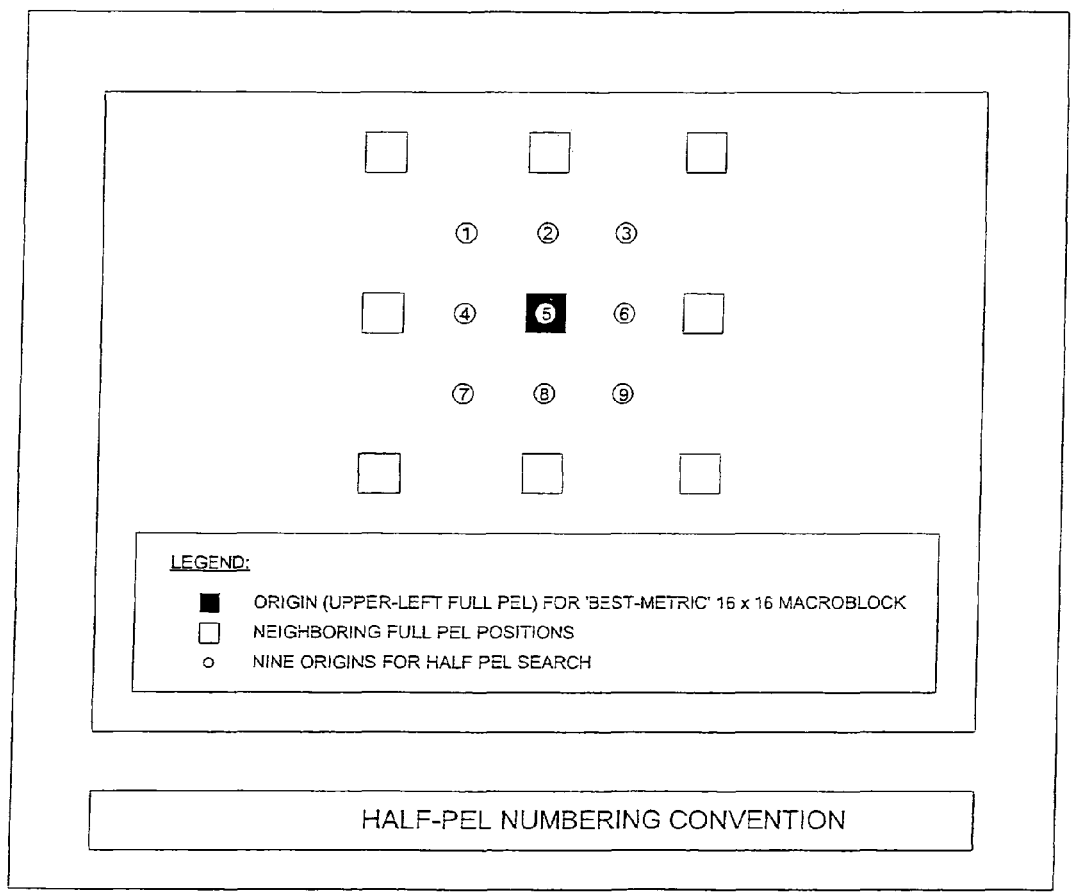
FIG. 9 shows a half-PEL numbering convention according to an embodiment of the invention.
Figure 10:
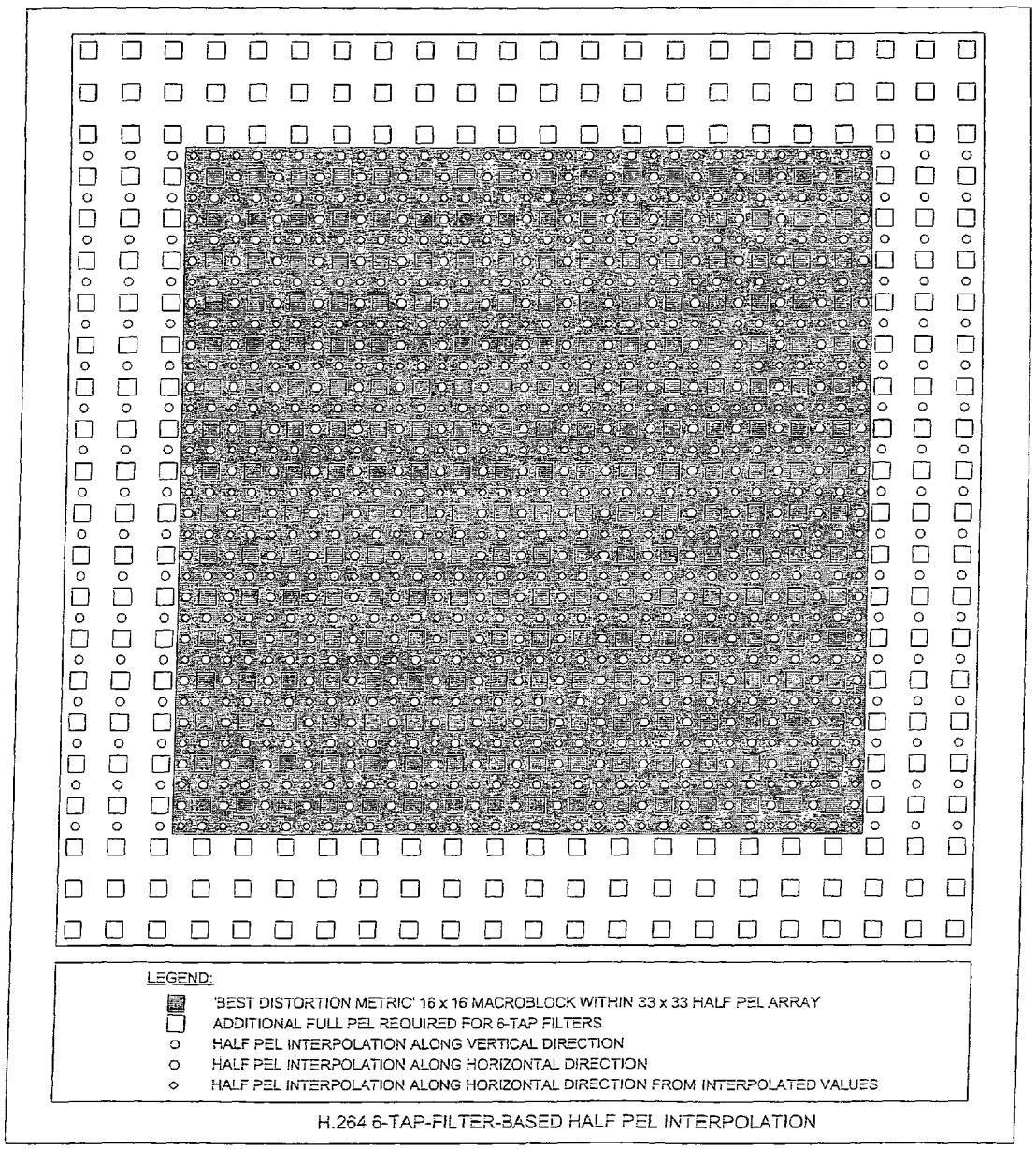
FIG. 10 shows a process of h.264 six-tap-filter-based half PEL interpolation according to an embodiment of the invention.
Figure 11:
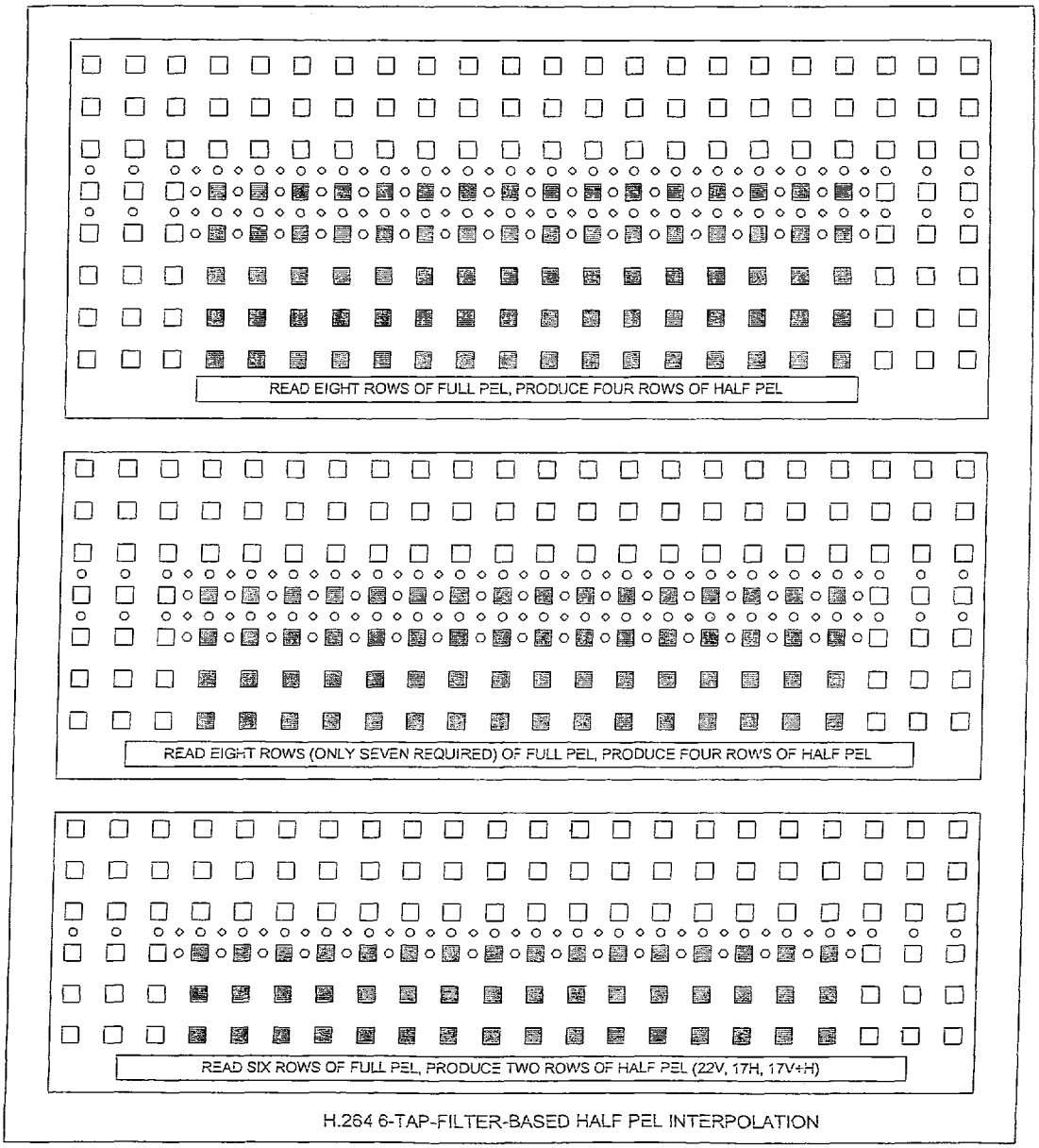
FIG. 11 shows a process of h.264 half PEL interpolation based on a six tap filter according to an embodiment of the invention.

Half PEL Search: After performing bilinear interpolation, the DVN calculates a SAD metric for each of the nine candidate half PEL positions. A numbering convention for the half PEL data is shown in FIG. 9. Note from the figure that the metric for the full PEL position (position '5') has already been calculated. Therefore, half PEL search consists of generating the SAD metrics for each of the other eight half PEL positions to determine which of the nine candidates has the best metric.

Output the Results: Output the best metric and the origin of the associated 16×16 macroblock within the 33×33 half PEL array to the specified node. Output the 16×16 macroblock itself to the decoder's motion compensation engine.

DVN Summary of Operation: The DVN includes the QST Node Wrapper, eight 2 KB node memories (each organized as 512 words by 32 bits), and a motion estimation engine (ME). The ME performs full PEL search, bilinear interpolation, and half PEL search as outlined above. It outputs the best metric and the origin of the associated 16×16 macroblock to the specified node; and it outputs the 16×16 macroblock itself to the decoder's motion compensation engine.

Each of eight node memories is partitioned into a ping pong buffer pair to allow fully overlapped data input and computation/results output. After one data set has been transferred from the specified memory to the eight DVN memories, the DVN ME performs its calculations and outputs its results. During this time, the next data set is transferred from another system memory to the eight DVN memories. And so on.

Each data set consists of a 48×48 PEL array (reference block) and a 16×16 PEL array (current block). These data are distributed among the eight node memories in a manner that optimizes the ME's access to the data. Generally, this includes access to four bytes of data from each of eight node memories every clock period. This allows sixteen SAD operations to be performed each clock period during 'fast search' mode, where one 16×16 search position is evaluated at a time. Additionally, for 'forty concurrent search positions' mode, it allows access to data from four rows of the reference block and data from four rows of the current block every clock period.

Node Memory Access Summary: Each data set is transferred from the specified memory to the eight DVN node memories via the matrix interconnect network (MIN) of the Adaptive Computing Machine (ACM) architecture, controlled by the specified node. For the 48×48 PEL reference block: Rows 0, 4, 8, . . . , 44 are written into sequential locations within node memory one; Rows 1, 5, 9, . . . , 45 are written into sequential locations within node memory two; Rows 2, 6, 10, . . . , 46 are written into sequential locations within node memory three; and Rows 3, 7, 11, . . . , 47 are written into sequential locations within node memory four. For the 16×16 PEL current block: Rows 0, 4, 8, and 12 are written into node memories one and five; Rows 1, 5, 9, and 13 are written into node memories two and six; Rows 2, 6, 10, and 14 are written into node memories three and seven; and Rows 3, 7, 11, and 15 are written into node memories four and eight.

During full PEL search, the ME reads reference block data from memories one through four, and it reads current block data from memories five through eight. During bilinear interpolation, the ME reads full PEL reference block data from memories one through four, and it writes reference block half PEL interpolated data into memories five through eight. During half PEL search, the ME reads reference block half PEL interpolated data from memories five through eight, and it reads current block data from memories one through four. Finally, to output the 16×16 macroblock to the decoder's motion compensation engine, the ME reads from memories five through eight and writes to the MIN.

Node Memory Organization (during data input to the node memories): For node memories one through four, reference block data will be stored sequentially at locations 0x00 to 0x8F; current block data will be stored sequentially at locations 0xC0 to 0xCF. For node memories five through eight, current block data will be stored sequentially at locations 0xC0 to 0xCF.

Node Memory Organization (during bilinear interpolation): For node memories five through eight, half PEL data for candidate position 1 (7) will be stored sequentially at locations 0x00 to 1x10. Half PEL data for candidate position 2 (8) will be stored sequentially at locations 0x20 to 0x30. Half PEL data for candidate position 3 (9) will be stored sequentially at locations 0x40 to 0x50. Half PEL data for candidate position 4 will be stored sequentially at locations 0x80 to 0x8F. Half PEL data for candidate position 5 will be stored sequentially at locations 0x90 to 0x9F. Half PEL data for candidate position 6 will be stored sequentially at locations 0xA0 to 0xAF.

DVN Programming Model: All configuration and control information for the DVN will reside in its TPL. Conditional operation will employ a suitable number of the wrapper's 64 counters and a suitable data structure for the search queue. A suitable number and nature of the hardwired search patterns for both full PEL search modes can be used.

Future DVN capabilities can, for example, include but are not limited to: increased SAD strength for faster full PEL search; ¼ PEL processing; and bicubic interpolation.

Figure 12:
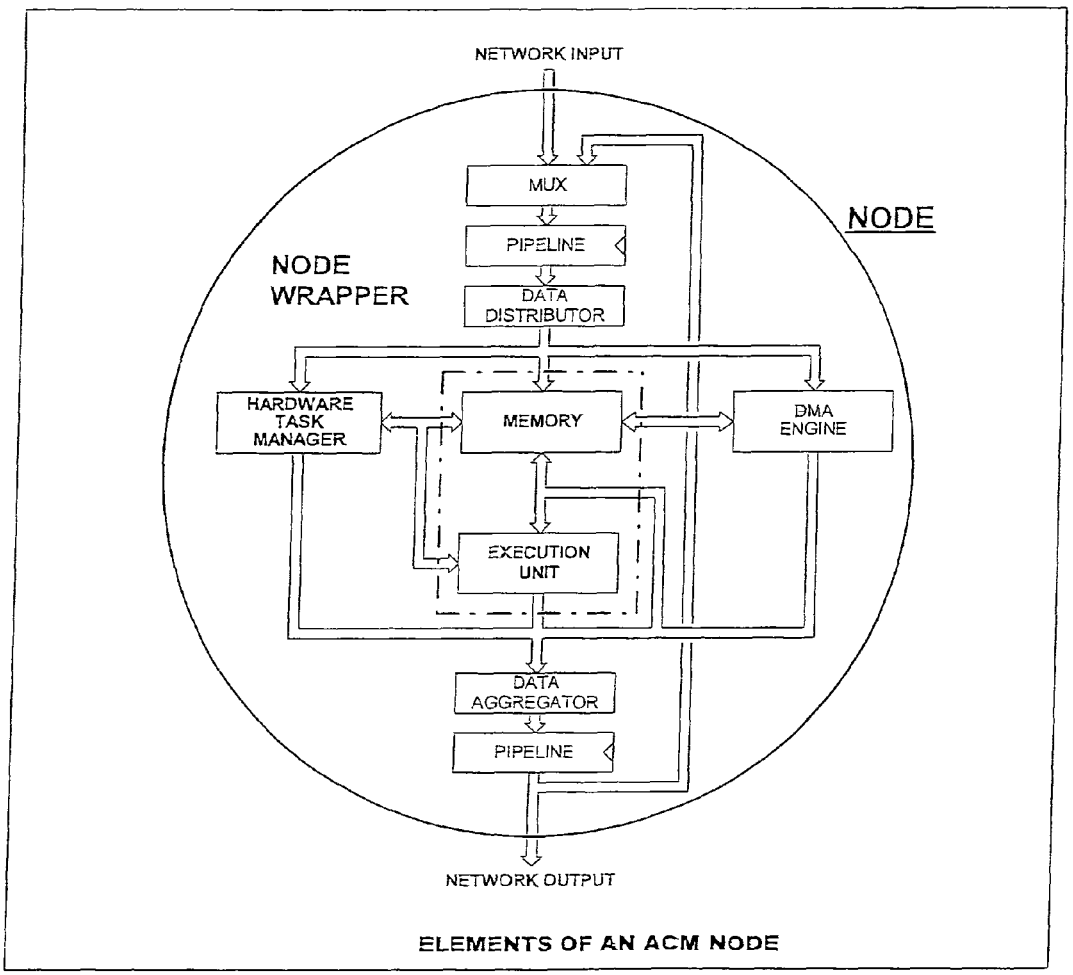
FIG. 12 shows some of the elements of an adaptive computing machine (ACM) node according to an embodiment of the invention.

The adaptive computing machine (ACM) includes heterogeneous nodes that are connected by a homogeneous network. Each node includes three elements: wrapper, memory, and execution unit as shown in FIG. 12.

The domain video node (DVN) is a reconfigurable digital video processor that achieves a power-area-performance metric comparable to application specific integrated circuits (ASIC), with the additional benefit of reconfigurability, enabling it to execute a number of commonly used motion estimation algorithms that might require multiple ASICs to achieve the same functionality.

Figure 13:
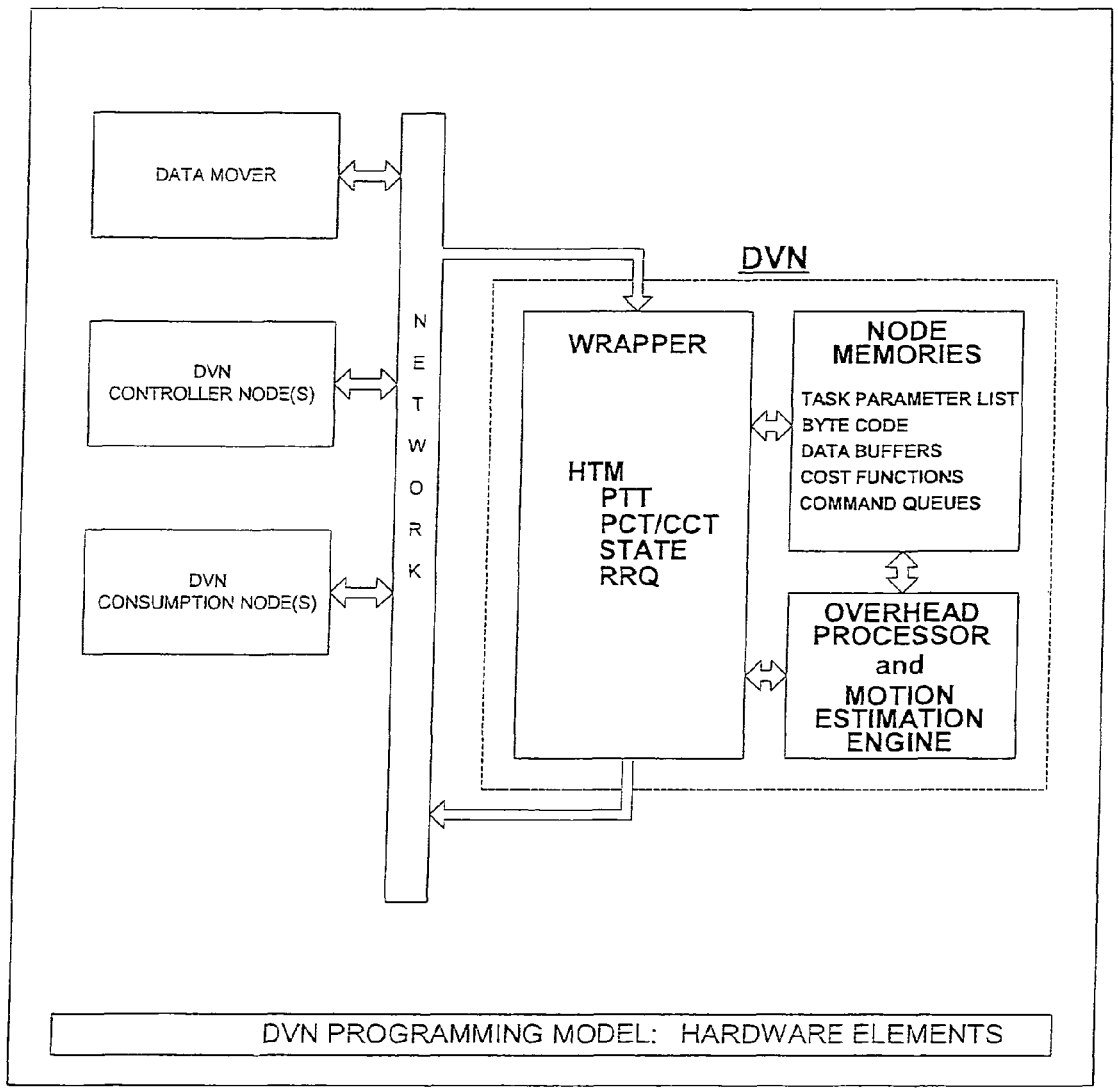
FIG. 13 shows some of the hardware elements within the domain video node (DVN) programming model according to an embodiment of the invention.

A block diagram that depicts the DVN programming environment is shown in FIG. 13. High level control of the DVN is provided by the hardware task manager (HTM) in the DVN node wrapper and a finite state machine (FSM) in the DVN EU. This interface includes the ACM-standard EU_RUN, EU_CONTINUE, and EU_TEARDOWN signals from the wrapper to the EU, and the ACK+TEST and EU_DONE responses from the EU to the wrapper.

The transition table for the FSM is shown in FIG. 14. The FSM assumes one of six states: Idle; Setup; Execute; ACK+TEST; Wait; or Continue. When the node is not enabled or the execution unit (EU) is not enabled, the FSM will enter, and remain in, its idle state. The FSM will also transition to its idle state whenever the node wrapper asserts the 'eu_abort' signal. Additionally, the FSM transitions to the idle state when it exits the wait state in response to the node wrapper's assertion of the 'eu_teardown' signal.

A typical operational sequence for the FSM will include the following transitions:

Idle to setup in response to the node wrapper's assertion of the 'eu_run' signal: During setup, byte code controls the initialization of the eu, loading its configuration registers with parameters stored in a 'task parameter list' (TPL) located in node memory.

Setup to execute in response to the 'done' setup byte code. During execute, the eu processes instructions from a command queue to perform the motion estimation operations of full PEL search, fractional PEL interpolation, fractional PEL search, macroblock signed differences, and the outputting of results.

Execute to ACK+TEST when the DONE instruction is read from the command queue. During ACK+TEST, acknowledgements are sent to the network to indicate how much data was produced and consumed during the motion estimation phase. Typically, the final acknowledgement will include the 'test' indication to query the node wrapper's hardware task manager (HTM): ? what's next ?

ACK+TEST to wait in response to ACK+TEST byte code: ACK+TEST. The FSM remains in its wait state until it receives its ? what's next ? response from the node wrapper.

Wait to idle in response to the node wrapper's assertion of the 'eu_teardown' signal. FSM asserts 'eu_done'.

Wait to continue in response to the node wrapper's assertion of the 'eu_continue' signal. During continue, byte code controls the reloading of certain eu registers with parameters from the TPL located in node memory.

Continue to execute in response to continue 'done' byte.

The above sequence returns control of the FSM to the node wrapper's HTM after ACK+TEST. The DVN also can be programmed to retain control after 'ack-ing'. Options include conditional/unconditional state transitions to continue or idle (after asserting 'eu_done'). Test conditions include the sign (msb) of any of the node wrapper's 64 counters, the sign (msb) of certain TPL entries, and the sign (msb) of a byte code controlled 5-bit down counter.

All of the information required for task execution is contained in a 'task parameter list' (TPL) located in node memory. During setup, DVN hardware retrieves from its node memory a pointer to the TPL. Pointers for up to 31 tasks are stored in 31 consecutive words in node memory at a location specified by the node wrapper signals {tpt_br[8:0], active_task[4:0]}.

Each DVN TPL is assigned 64 longwords of node memory. The first eight entries of the TPL are reserved for specific information. The remaining 56 longwords are available to store parameters for setup, ACK+TEST, and continue.

TPL location 0x00 contains two parameters for setup: the starting address in node memory for its byte code and the offset from the TPL pointer to its parameters. TPL location 0x01 contains two parameters for ACK+TEST: the starting address in node memory for its byte code and the offset from the TPL pointer to its parameters. TPL location 0x02 contains one parameter for teardown: the starting address in node memory for its byte code. (Currently, there is nothing to 'teardown', so this is a placeholder in the event that there is a requirement later on). TPL location 0x03 contains three parameters for continue: the starting address in node memory for its byte code and the offsets from the TPL pointer to its two sets of parameters. TPL locations 0x04 and 0x05 are used for a pair of semaphores that the byte code can manipulate; and locations 0x06 and 0x07 are reserved. TPL locations 0x08 through 0x3F are available for storing all other task parameters.

Figure 15:
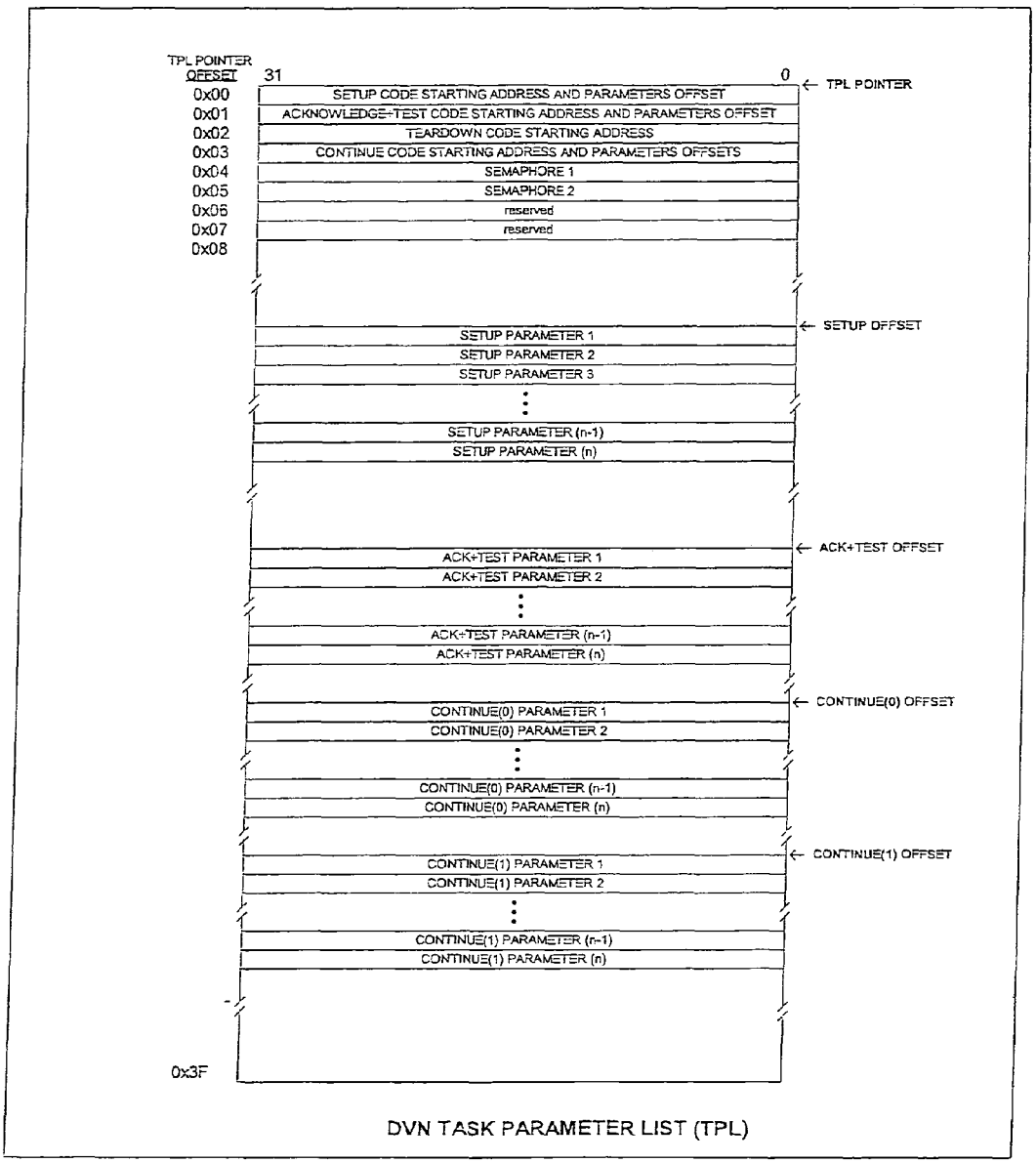
FIG. 15 shows a task parameter list (TPL) for a DVN according to an embodiment of the invention.

The layout for the DVN task parameter list is shown in FIG. 15. The TPL stores sets of parameters for each of three states: setup, ACK+TEST, and continue. For the continue state, there can be two sets of parameters, with each set having the same number of parameters but different TPL pointer offsets. This allows for the conditional selection between one-of-two sets of global parameters, such as consumer node(s) destination, fractional PEL interpolation filters, and so on. The set of parameters for a specific state must be stored in consecutive locations in the TPL. As byte code LOAD instructions execute, the DVN hardware selects the next parameter in the set. The offset from the TPL pointer to the location of the first parameter for that state must be in the range: 0x08 to 0x3F.

Figure 16:
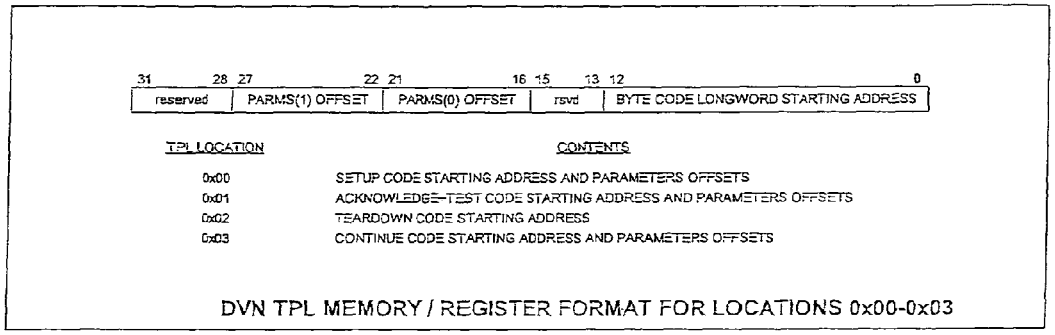
FIG. 16 shows a format for locations 0x00 to 0x03 within a TPL according to an embodiment of the invention.
Figure 17:
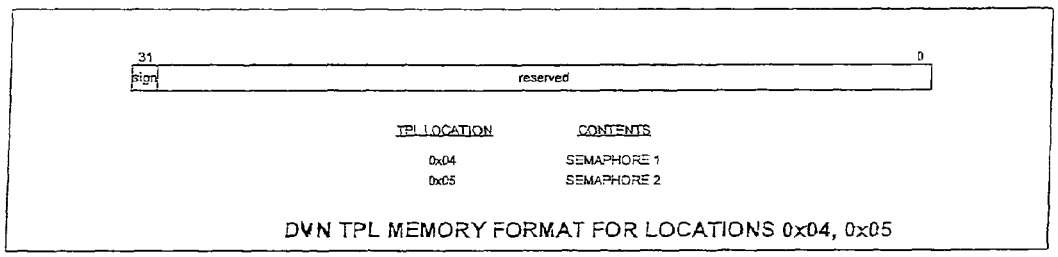
FIG. 17 shows a format for locations 0x04 and 0x05 within a TPL according to an embodiment of the invention.
Figure 18:
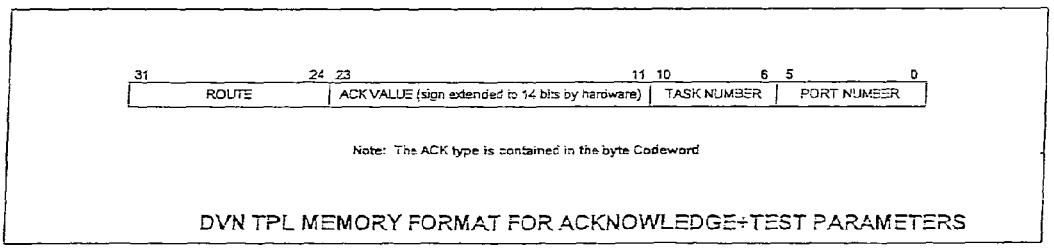
FIG. 18 shows a format for acknowledge+test parameters within a TPL according to an embodiment of the invention.
Figure 19:
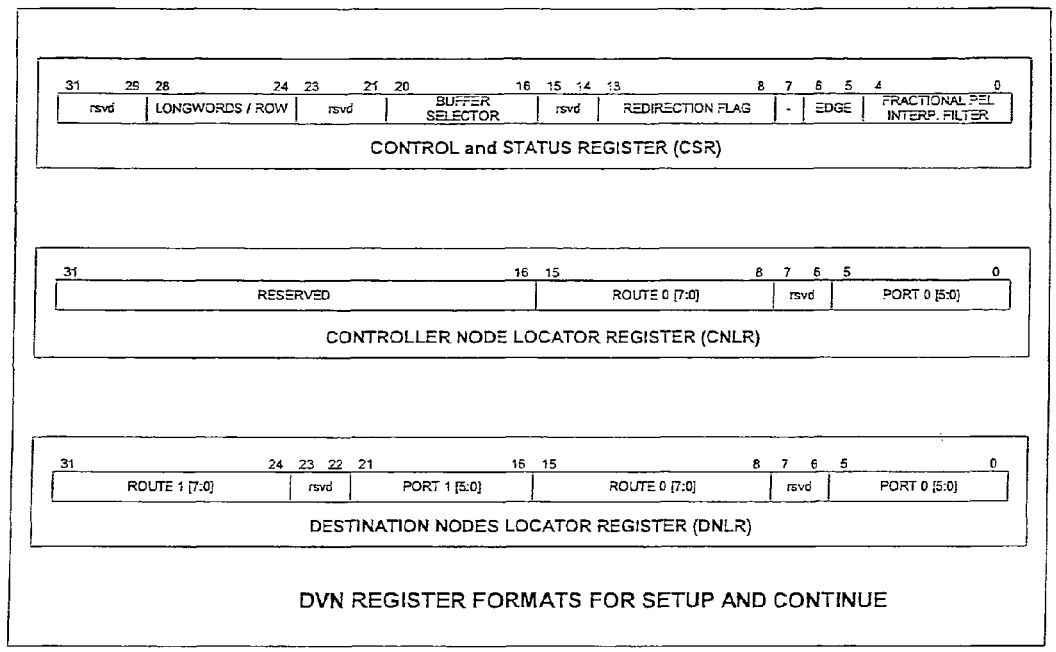
FIG. 19 shows a format for setup and continue registers according to an embodiment of the invention.

DVN TPL Memory/Register Formats: The format for TPL locations 0x00 through 0x03 that contain byte code starting addresses and TPL pointer offsets is shown in FIG. 16. The format for the two semaphores at TPL locations 0x04 and 0x05 is shown in FIG. 17. The format for the ACK+TEST parameters beginning at TPL location (TPL pointer plus ACK+TEST offset) is shown in FIG. 18. The formats for the registers that are loaded with TPL parameters during setup and continue are shown in FIG. 19.

Control and Status Register (CSR): The DVN CSR includes fields which specify which interpolation filters to use, how to interpolate at reference block edges, which of 64 flags indicates 'command queue redirection', which ping/pong buffer pairs to use, and, for the reference block, the number of longwords per row.

Tables 1 and 2 describe bits [6:5] and bits [4:0].

TABLE 1

Fractional PEL Interpolation Filter Selection Bits [4:0]

| Bit<br>4 3 2 1 0 | Filter |
|---|---|
| 0 0 0 0 1 | Bilinear Interpolation |
| 0 0 0 1 0 | MPEG4 |
| 0 0 1 0 0 | H.264 |
| 0 1 0 0 0 | WMV |
| 1 0 0 0 0 | Reserved |

TABLE 2

Interpolation Method at Reference Block Edges Bits [6:5]

| Bit 6 5 | Method |
|---------|--------|
| 0 0 | All required PEL are in DVN node memory |
| 0 1 | Mirror |
| 1 0 | Replicate |
| 1 1 | Reserved |

Bits [13:8] are the command queue redirection flag. Always while processing a command queue, the DVN monitors continuously one of 64 wrapper counter sign bits indicated by bits [13:8]. When the counter sign bit is set to 1 'b1, The DVN will clear the bit, send the 'switch' indication to the controller, suspend processing from command queue (A/B), and resume processing from command queue (B/A).

Bits [20:16] are buffer selectors. Each of the five bits selects between a pair of ping/pong buffers. Bit16 is the 'Reference Block Buffer Selection,' where 0 selects reference block A; and 1 selects reference Block B. Bit17 is the 'Current Block Buffer Selection,' where 0 selects current Block A; and 1 selects current block B. Bit18 is the 'Command Queue Buffer Selection,' where 0 selects command queue A; and 1 selects command queue B. Bit19 is the 'Horizontal Cost Function Buffer Selection' where 0 selects horizontal cost function table A; and 1 selects horizontal cost function table B. Bit20 is the 'Vertical Cost Function Buffer Selection,' where 0 selects vertical cost function table A; and 1 selects vertical cost function table B.

Bits [28:24] are the 'Reference Block Longwords per Row.' The number of longwords comprising a reference block row is required by the node memory addressing unit to support strides from row (k) to row (k+4).

Controller Node Locator Register (CNLR): The DVN communicates with its controller using the PTP protocol, which requires a port number (i.e. bits [5:0]) and a node id (i.e. bits [15:8]).

Destination Nodes Locator Register (DNLR): When processing command queue instructions that include output to destination (consumer) nodes, the DVN will use its one bit logical output port field to select one of two destination nodes: When the bit is set to 1 'b0, its output will be directed to node id (i.e. bits(15:8]), port number (i.e. bits [5:0]); and when the bit is set to "b1, its output will be directed to node id (i.e. bits [31:24]), port number (i.e. bits [21:16]).

Figure 20:
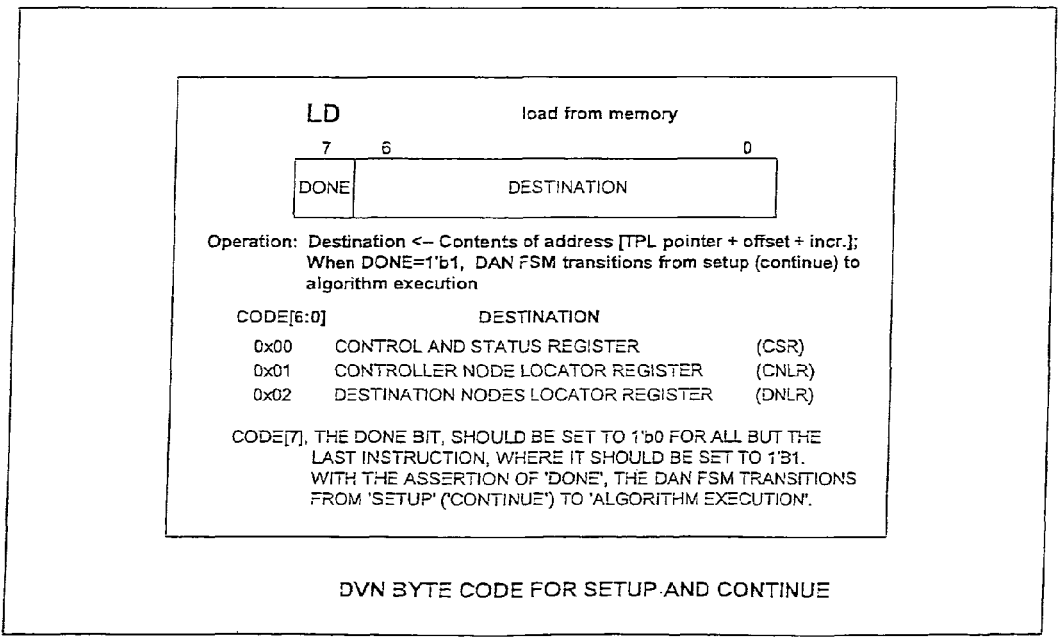
FIG. 20 shows a format for setup and continue byte codes according to an embodiment of the invention.

DVN Byte Codes: The DVN overhead processor (OHP) interprets two distinct sets of byte codes: one for setup and continue and another for ACK+TEST. The FSM state indicates which set should be used by the byte code interpreter. For setup and continue, there is only one byte code: LOAD as shown in FIG. 20. There is a more comprehensive set of byte codes for ACK+TEST. These are summarized in FIGS. 21A through 40E. ACK+TEST byte codes 0x80 through 0xFF are reserved, and may be treated as NOPs, or 'no operation'.

For the DVN, one of the programming steps requires writing byte code and generating task parameter lists. Byte code is always executed 'in line', and byte code must start on longword boundaries. Byte code execution is 'little endian'; that is, the first byte code that will be executed is byte[7:0] of the first longword, then byte[15:8], then byte[23:16], then byte[31:24], then byte[7:0] of the second longword, and so on.

TPL/Byte Code Programming Example: The task parameter list and byte code for a 'typical' task are shown in FIG. 22. The TPL consists of 21 longwords, and there are 5 longwords of byte code. Setup requires three clock cycles to load registers from the TPL; DONE is indicated in the last of three cycles. ACK+TEST requires a minimum of ten clock cycles: two for producer acknowledgements, two for consumer acknowledgements, two (or more) to test (and wait, if necessary) for input buffer ready, two (or more) to test (and wait, if necessary) for output buffer ready, and two to test a counter sign to select one of two sets of configuration registers. Continue requires three clock cycles to update the CSR, CNLR, and DNLR configuration registers.

Command Queue Overview: The Programming Model for the DVN includes the creation of sequences of instructions that are stored in command queues in DVN node memory. These instructions control the motion estimation operations of full PEL search, fractional PEL interpolation, fractional PEL search, (perhaps macroblock signed differences) and the outputting of results.

Figure 23:
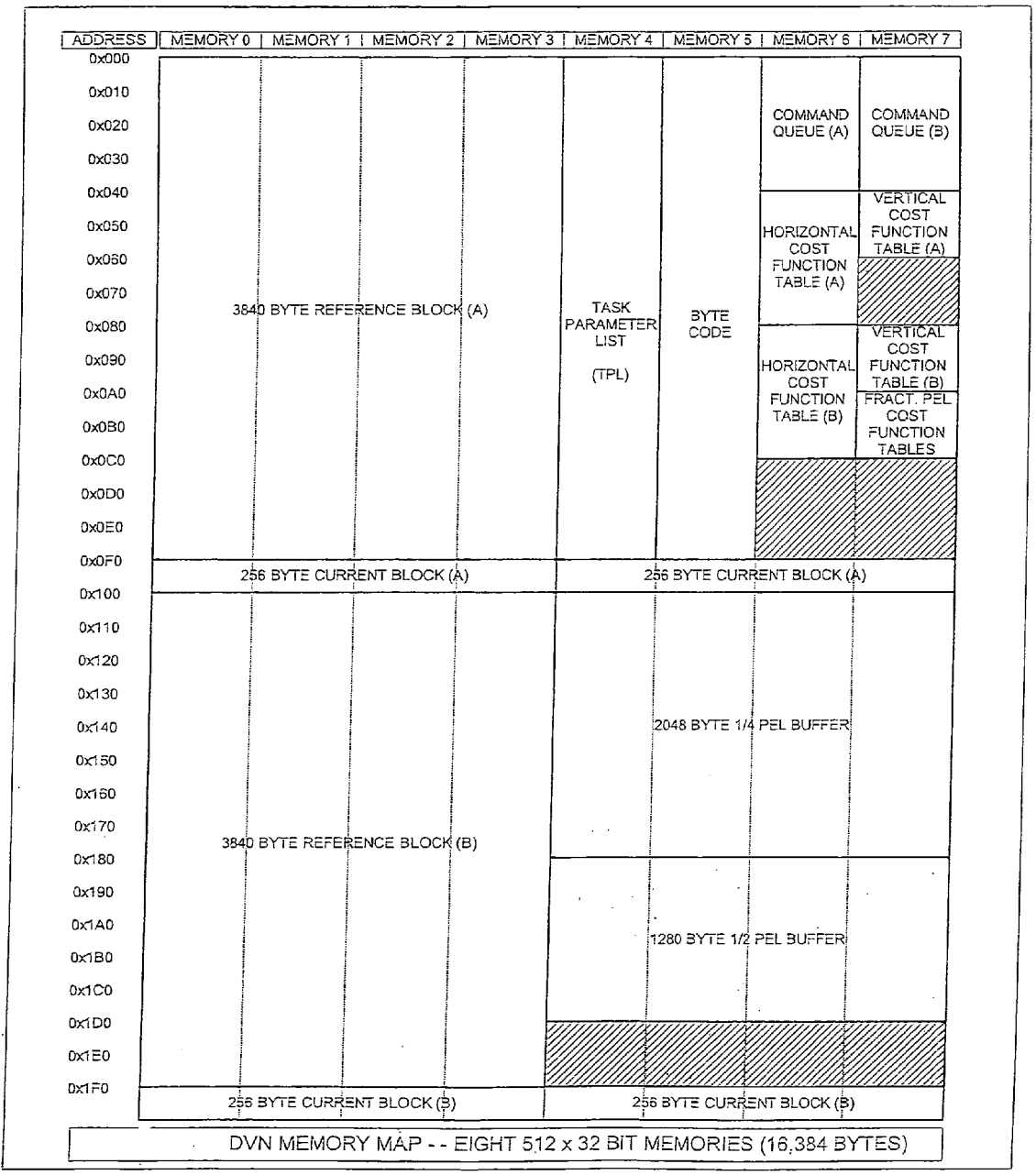
FIG. 23 shows a memory map, according to an embodiment of the invention, for a DVN memory organized as eight banks having 512 words of 32 bits.

The DVN memory map is shown in FIG. 23. For the processing of each macroblock, the DVN will be directed by an entry in its task parameter list (TPL) to fetch its instructions from one of two buffers in its node memory: Command Queue A; or Command Queue B. The data structures for the two will be identical. The intent is to store a fixed set of instructions in one (or both) static command queue(s), or to construct an interactive sequence of commands in one (or both) dynamic command queue(s), and to select between the two buffers on a macroblock-by-macroblock basis. Including a second command queue allows for terminating one sequence of instructions and continuing with a new sequence of instructions, while preserving the entire previous sequence of instructions for subsequent reuse.

Each of the two command queues will be transferred to DVN node memory using the standard ACM PTP (or DMA) protocols (consuming one or two of the available 32 input ports). Command Queue A will consist of 64 longwords (32 bits per longword) in node memory six, locations 0x00 to 0x3F, and Command Queue B will consist of 64 longwords in node memory seven, locations 0x00 to 0x3F.

The DVN controller node initializes Command Queue A (CQA) by writing 0x6C00 into the DVN wrapper port translation table (PTT) at the location corresponding to the assigned DVN input port number. This sets the CQA buffer to a size of 256 bytes (64 longwords) with a starting address of 'memory=6, physical address=0x000'. The initialization value for Command Queue B (CQB)=0x6E00, 'memory=7, physical address=0x000'. The controller loads CQA and CQB, 64-longword circular buffers, using PTP writes. It re-initializes the buffers by rewriting 0x6C00/0x6E00 into the appropriate locations in the DVN PTT. The DVN fetches CQA/CQB instructions using a 6-bit counter (initialized to zero).

The data structure for the command queues is shown in FIG. 24. Bit 31 is used to indicate a 'valid' instruction, and it must be set to 1 'b1 in every instruction that the controller writes into the buffer. When the DVN reads a queue entry with bit 31 set to 1'b0, it will stall until that bit has been set to 1 'b1 or until it is redirected.

While processing an instruction sequence fetched from CQA/CQB, the controller can command the DVN to: 1) terminate its processing of instructions from one queue; 2) clear its pointer to the other queue; or 3) resume its processing from location zero of the other queue. This 'switch' command from the controller to the DVN utilizes one of 64 counter signs in the DVN node wrapper. The controller writes the appropriate PCT/CCT counter with the msb set to 1 'b1. (We assume here that the bit had previously been initialized to 1 'b0). The DVN continuously monitors this bit while processing. At DVN task setup, a six bit register is loaded from the TPL to select the appropriate one-of-64 counter signs to monitor. As part of its 'switch' routine, the DVN will clear this bit by sending the 'self-ack, initialize counter' MIN word, and it will send the 'switch complete' message to the controller (See FIG. 25).

Description of the DVN Command Queue Data Structures: The data structures used in the command queue of the DVN are described below with reference to FIG. 24.

Evaluate the Metric for a Single 16×16 Macroblock—Command 0x0: Determine metric for one position (X, Y), where 0,0 indicates the upper left PEL of the reference block; X is a positive integer in the range of 0 to 79, and Y is a positive integer in the range of 0 to 49. These positive integers indicate the displacements from the upper left PEL. The DVN performs the evaluation of the metric: SAD256 plus horizontal cost function plus vertical cost function. The cost functions are stored in node memory.

Determine Best Metric for One or More Sets of 5×5 Positions—Command 0x1: Determine the best metric from m(H)-by-n(V) 5×5 sets of positions starting at position (X, Y). X is a positive integer in the range of 0 to 79, and Y is a positive integer in the range of 0 to 49. m is a positive integer in the range of 1 through 16; n is a positive integer in the range of 1 through 10 (See FIG. 26).

Half PEL Interpolation—Command 0x2: For a 16×16 macroblock, perform full PEL to half PEL interpolation. Bit [24] is 'Evaluate': 0 means interpolate only; and 1 means interpolate and evaluate eight (nine) half PEL 16×16 macroblocks. Bit [25] is 'Mode': 0 means use 'best metric' vector to select macroblock; and 1 means use (X, Y) reference, i.e. bits [14:8] and bits [5:0], to select the macroblock.

Quarter PEL Interpolation—Command 0x3: Perform quarter PEL interpolation. Bit [24] is 'Evaluate': 0 means interpolate only; and 1 means interpolate and evaluate eight (nine) quarter PEL 16×16 macroblocks. Bit [25] is 'Mode': 0 means use 'best metric' vector from half PEL search to select the macroblock; and 1 means use half PEL buffer location, i.e. bits [11:0], to select the macroblock.

Full PEL Signed Difference—Command 0x4: Perform the signed difference between the 16×16 current block and a 16×16 full PEL macroblock selected from the reference block. Output to the selected destination the 256 values as 16-bit 2's complement integers in the range −255 to 255 packed in 128 longwords. Bit [25] is 'Mode': 0 means use 'best metric' vector from full PEL search to select the macroblock; and 1 means use (X, Y) reference, i.e. bits [14:8] and bits [5:0], to select macroblock. Bit [26] is 'Destination,' which selects from one of two logical output ports. For each port, the TPL contains the associated routing, input port number, and memory mode indication for the selected destination.

Half PEL Signed Difference—Command 0x5: Perform the signed difference between the 16×16 current block and a 16×16 half PEL macroblock selected from the half PEL buffer. Output to the selected destination the 256 values as 16-bit 2's complement integers in the range −255 to 255 packed in 128 longwords. Bit [25] is 'Mode': 0 means use 'best metric' vector from half PEL search to select the macroblock; and 1 means use the half PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Quarter PEL Signed Difference—Command 0x6: Perform the signed difference between the 16×16 current block and a 16×16 quarter PEL macroblock selected from the quarter PEL buffer. Output to the selected destination the 256 values as 16-bit 2's complement integers in the range −255 to 255 packed in 128 longwords. Bit [25] is 'Mode': 0 means use 'best metric' vector from quarter PEL search to select the macroblock; and 1 means use the half PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Output a Full PEL 16×16 Macroblock—Command 0x7: Transfer the selected full PEL 16×16 macroblock from the reference block in DVN node memory to the indicated destination. Bit [25] is 'Mode': 0 means use 'best metric' vector from full PEL search to select the macroblock; and 1 means use the (X,Y) reference, i.e. bits [14:8] and bits [5:0], to select the macroblock. Bit [26] is 'Destination,' which selects from one of two logical output ports. For each one, the TPL contains the associated routing, input port number, and memory mode indication for the selected destination.

Output a Half PEL 16×16 Macroblock—Command 0x8: Transfer the selected half PEL 16×16 macroblock from the half PEL buffer in DVN node memory to the indicated destination. Bit [25] is 'Mode': 0 means use 'best metric' vector from the half PEL search to select the macroblock; and 1 means use the half PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Output a Quarter PEL 16×16 Macroblock—Command 0x9: Transfer the selected quarter PEL 16×16 macroblock from the quarter PEL buffer in DVN node memory to the indicated destination. Bit [25] is 'Mode': 0 means use 'best metric' vector from the quarter PEL search to select the macroblock; and 1 means use the quarter PEL buffer location, i.e. bits [11:0] to select the macroblock. Bit [26] is 'Destination,' which selects from one of two logical output ports. For each one, the TPL contains the associated routing, input port number, and memory mode indication for the selected destination.

Output Best Metric—Command 0xA: Transfer the best metric (saturated unsigned 16 bit integer) to the indicated destination(s). Bit [25] is 'Mode': 0 means s end to controller only; and 1 means send to controller and send to indicated destination. Bit [26] is 'Destination,' which selects from one of two logical output ports. For each one, the TPL contains the associated routing, input port number, and memory mode indication for the selected destination.

Output Motion Vector—Command 0xB: Transfer the motion vector, with quarter PEL resolution, to the indicated destination(s). Bit [25] is 'Mode': 0 means s end to controller only; and 1 means send to controller and send to indicated destination. Bit [26] is 'Destination,' which selects from one of two logical output ports. For each one, the TPL contains the associated routing, input port number, and memory mode indication for the selected destination.

Done—Command 0xC: The DONE command indicates to the DVN that there is no additional processing to be performed for the 'current block'. After reading this command from the queue, the DVN will send the DONE status word to the controller; and the DVN FSM will transition to the ACK+TEST state.

Echo—Command 0xF: The ECHO command instructs the DVN to return a status word that is the command itself. This is intended to be a diagnostics aid.

DVN to Controller Status Word: After the DVN executes each command, it will send a status word to the controller, using the ACM PTP protocol. The DVN TPL will contain the appropriate routing field, input port number, and memory mode indication that is required to support this operation.

This information is transferred to the DVN CNLR during 'setup' and 'continue' operations. A summary of the status word is shown in FIG. 25.

Figure 41:
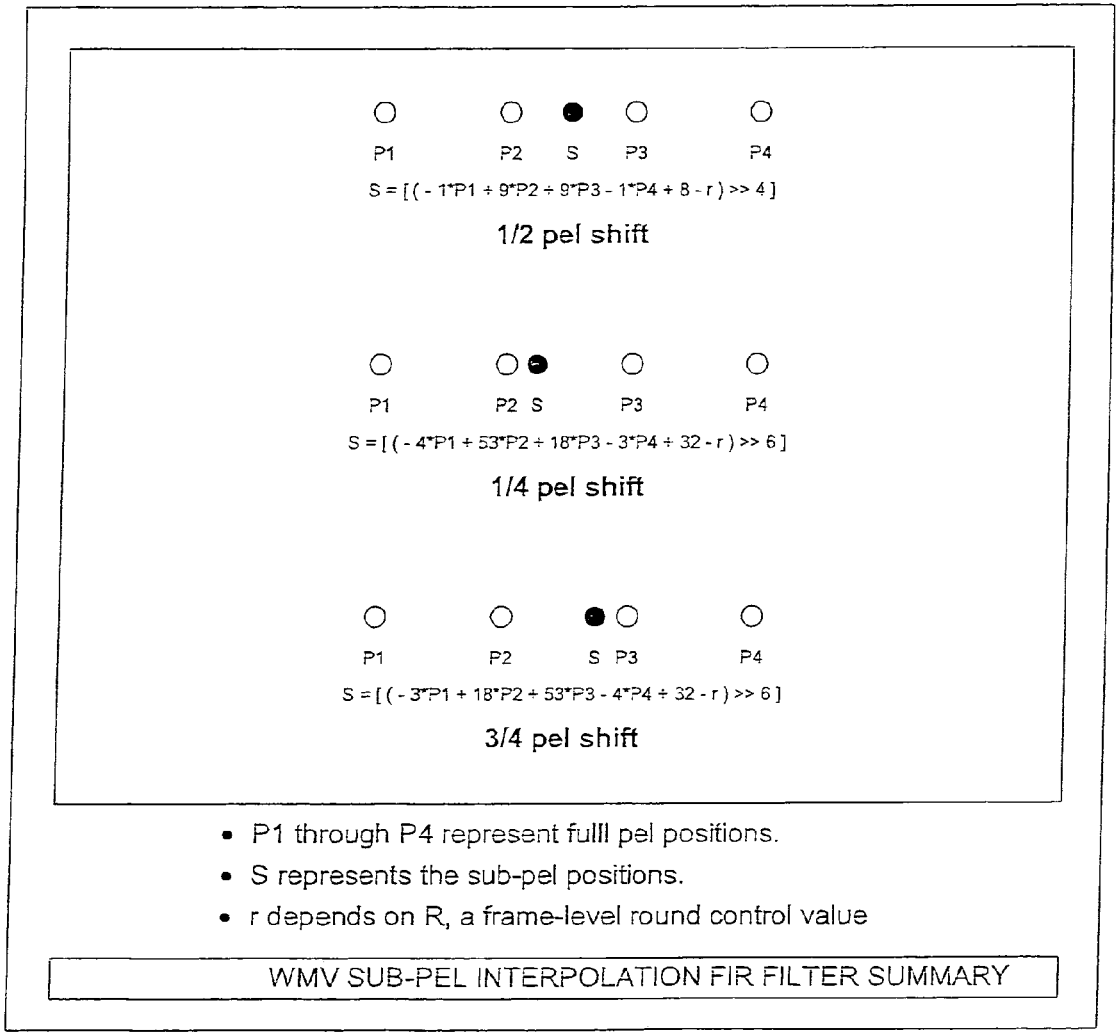
FIG. 41 shows a summary of a sub-PEL interpolation FIR filter for Microsoft Windows® media video (WMV) according to an embodiment of the invention.

For Commands 0x0 and 0x1, the status word includes the best full PEL metric thus far for this particular current block. It also includes the corresponding vector, in full PEL units with a range of 0 to 79 for the horizontal dimension and 0 to 49 for the vertical dimension. For Command 0x2, full PEL to half PEL interpolation, when bit [24] of the command is set to 1 'b1 (interpolate and evaluate), status word bits [15:0] indicate the value for the best half PEL metric, and bits [19:16] indicate with which of nine half PEL candidates the best metric is associated. (The half PEL numbering convention shown in FIG. 41 is used to code bits [19:16]). When bit [24] of the command is set to 1 'b0 (interpolate only), bits [15:0] indicate the value for the previously evaluated best full PEL metric, and bits [19:16] are set to 0xF to indicate interpolation 'done'.

Figure 43:
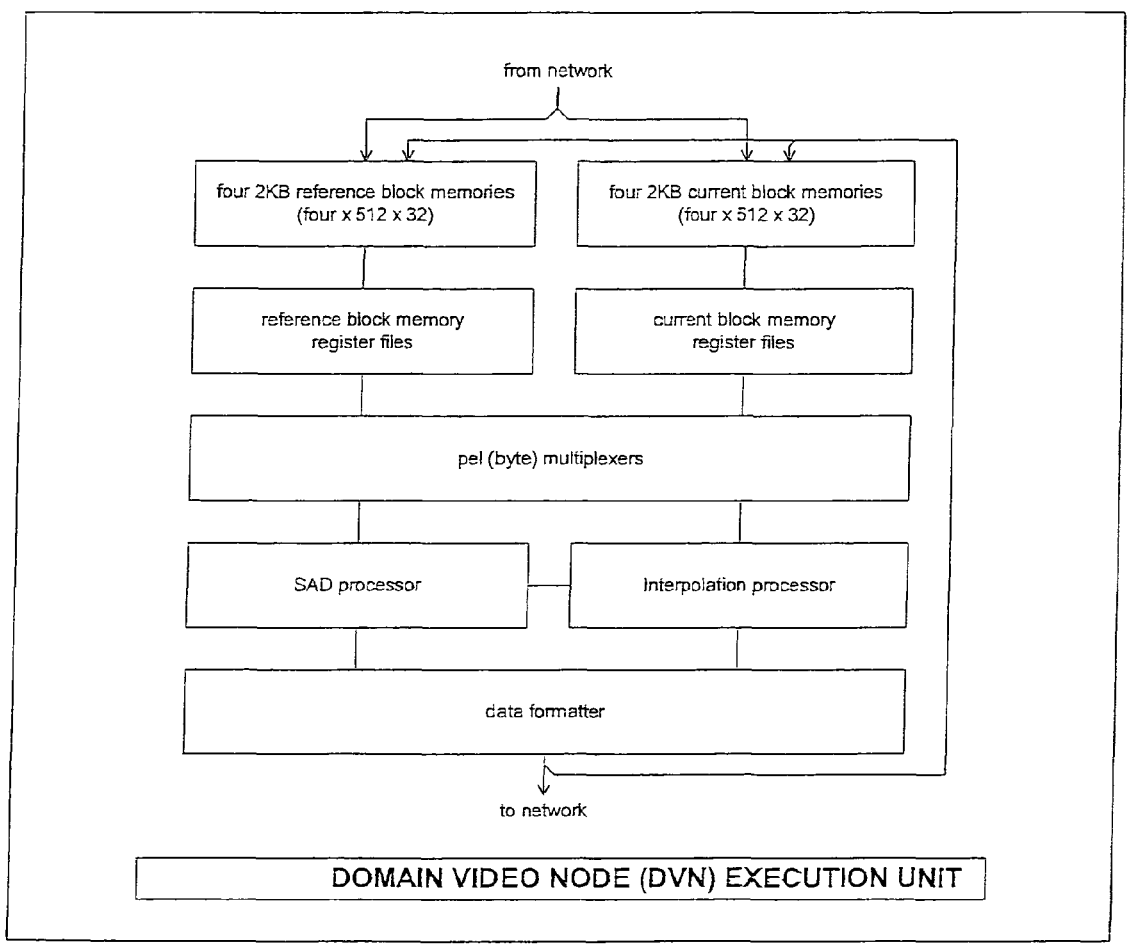
FIG. 43 shows an execution unit for a DVN according to an embodiment of the invention.

For Command 0x3, half PEL to quarter PEL interpolation, when bit [24] of the command is set to 1 'b1 (interpolate and evaluate), status word bits [15:0] indicate the value for the best quarter PEL metric, and bits [19:16] indicate with which of nine quarter PEL candidates the best metric is associated. (The quarter PEL numbering convention shown in FIG. 43 is used to code bits [19:16]). When bit [24] of the command is set to 1 'b0 (interpolate only), bits [15:0] indicate the value for the previously evaluated best metric (either full PEL or half PEL if the latter has been evaluated), and bits [19:16] are set to 0xF to indicate interpolation 'done'.

For Commands 0x4, 0x5, 0x6, 0x7, 0x8, and 0x9, the status word will be, respectively, 0xFF010000, 0xFF020000, 0xFF040000, 0xFF080000, 0xFF10000, and 0xFF200000 to indicate 'done'. For Command 0xA, the status word will be the best metric, a saturated, unsigned 16 bit integer. For Command 0xB, the status word will be the motion vector, with quarter PEL resolution. For Command 0xC, the status word will be 0xFF400000 to indicate 'done'. For Command 0xF, the status word will echo the command itself. This is intended to be a diagnostics aid. In response to the 'command queue redirection' flag, the status word will be 0xFF800000 to indicate 'done'.

DVN Node Memory: The DVN includes eight 2 KB physical memories, each organized as 512 words-by 32 bits per word, for a total node memory capacity of 16 KB. This allows the reading of 32 bytes of video data and the processing of sixteen 'sum of absolute differences' of these data each clock cycle. The 16 KB capacity also allows double buffering for fully overlapped data input/output and computation.

Any ACM can write into DVN node memory using the PTT in the DVN wrapper and any of the three services: PTP, DMA, or RTI. Additionally, the Knode can PEEK/POKE DVN node memory.

The DVN node memory map is shown in FIG. 23. The allocated buffers are described in Table 3:

TABLE 3

Memory Map for DVN Node

| Buffer | Capacity | Address Range (longwords) |
|---|---|---|
| Reference Block | 3840 bytes | 0x000 to 0x0EF |
| | | 0x200 to 0x2EF |
| | | 0x400 to 0x4EF |
| | | 0x600 to 0x6EF |
| Reference Block B | 3840 bytes | 0x100 to 0x1EF |
| | | 0x300 to 0x3EF |
| | | 0x500 to 0x5EF |
| | | 0x700 to 0x7EF |
| Current Block A | 256 bytes | 0x0F0 to 0x0FF |
| | | 0x2F0 to 0x2FF |
| | | 0x4F0 to 0x4FF |
| | | 0x6F0 to 0x6FF |
| Current Block B | 256 bytes | 0x1F0 to 0x1FF |
| | | 0x3F0 to 0x3FF |
| | | 0x5F0 to 0x5FF |
| | | 0x7F0 to 0x7FF |
| Current Block A | 256 bytes | 0x8F0 to 0x8FF |
| | | 0xAF0 to 0xAFF |
| | | 0xCF0 to 0xCFF |
| | | 0xEF0 to 0xEFF |
| Current Block B | 256 bytes | 0x9F0 to 0x9FF |
| | | 0xBF0 to 0xBFF |
| | | 0xDF0 to 0xDFF |
| | | 0xFF0 to 0xFFF |
| Task Parameter List | 960 bytes | 0x800 to 0x8EF |
| Byte Code | 960 bytes | 0xA00 to 0xAEF |
| Command Queue A | 256 bytes | 0xC00 to 0xC3F |
| Command Queue B | 256 bytes | 0xE00 to 0xE3F |
| Horizontal Cost Function Table A | 256 bytes | 0xC40 to 0xC7F |
| Horizontal Cost Function Table B | 256 bytes | 0xC80 to 0xCBF |
| Vertical Cost Function Table A | 128 bytes | 0xE40 to 0xE5F |
| Vertical Cost Function Table B | 128 bytes | 0xE80 to 0xE9F |
| Fraction PEL Cost Function Tables | 128 bytes | 0xEA0 to 0xEBF |
| Half PEL Buffer | 1280 bytes | 0x980 to 0x9CF |
| | | 0xB80 to 0xBCF |
| | | 0xD80 to 0xDCF |
| | | 0xF80 to 0xFCF |
| Quarter PEL Buffer | 2048 bytes | 0x900 to 0x97F |
| | | 0xB00 to 0xB7F |
| | | 0xD00 to 0xD7F |
| | | 0xF00 to 0xF7F |

This assumes that reference blocks and current blocks are transferred from the 'Data Mover' to the eight DVN node memories via the MIN. This also assumes that the 'Data Mover' is controlled by a PSN node. Reference blocks are organized M-PEL per row by N-PEL per column. M and N are integer multiples of 5, consistent with the 5×5 positions-at-a-time search strategy. M has a range of 20 to 95 (20, 25, 30, . . . , 90, 95); N has a range of 20 to 65 (20, 25, 30, . . . , 60, 65).

Reference Block Options: A summary of allowable combinations for M and N that do not exceed the 3840 byte reference block capacity, along with the attendant number of exhaustive search processing cycles, is shown in FIG. 26.

For each M-PEL by N-PEL reference block transfer from the Data Mover to DVN node memory as follows: Rows 0, 4, 8, . . . , [M-(M)mod4] are written into sequential locations in node memory zero; Rows 1, 5, 9, . . . , [M-(M−1)mod4] are written into sequential locations in node memory one; Rows 2, 6, 10, . . . , [M-(M−2)mod4] are written into sequential locations in node memory two; and Rows 3, 7, 11, . . . , [M-(M−3)mod4] are written into sequential locations in node memory three.

For each 16-PEL by 16-PEL current block transfer from the Data Mover to DVN node memory: Rows 0, 4, 8, and 12 are written into node memories zero and four; Rows 1, 5, 9, and 13 are written into node memories one and five; Rows 2, 6, 10, and 14 are written into node memories two and six; and Rows 3, 7, 11, and 15 are written into node memories three and seven.

During full PEL search, the DVN motion estimation engine (ME) reads reference block data from memories zero through three, and it reads current block data from memories four through seven. During half PEL interpolation, the ME reads full PEL reference block data from memories zero through three, and it writes half PEL interpolated data into memories four through seven. When half PEL search is performed concurrently with half PEL interpolation, the ME reads current block data from memories four through seven. During quarter PEL interpolation, the ME reads half PEL interpolated data from memories four through seven, and it writes quarter PEL interpolated data into memories four through seven. When quarter PEL search is performed concurrently with quarter PEL interpolation, the ME reads current block data from memories zero through three. During output, the ME reads full PEL macroblocks from memories zero through three, fractional PEL macroblocks from memories four through seven, and for macroblock signed differences, current blocks from memories zero through three/four through seven for full PEL/fractional PEL macroblocks, respectively.

Cost Function Tables: For each full PEL search position, the DVN evaluates the metric: SAD256 plus horizontal cost function plus vertical cost function. The cost functions are stored in node memory. The cost function is an unsigned 16 bit integer.

For an M-column by N-row reference block, there are M horizontal cost functions and N vertical cost functions. In each horizontal cost function table, two 16 bit integers, a pair of horizontal cost functions, are packed in each 32 bit longword in the table. The cost functions for columns 0 and 1 are stored at table location 0, the cost functions for columns 2 and 3 are stored at table location 1, and so on. Cost functions for even numbered columns are stored in bits [15:0] of the longword; cost functions for odd numbered columns are stored in bits [31:16] of the longword.

Figure 27:
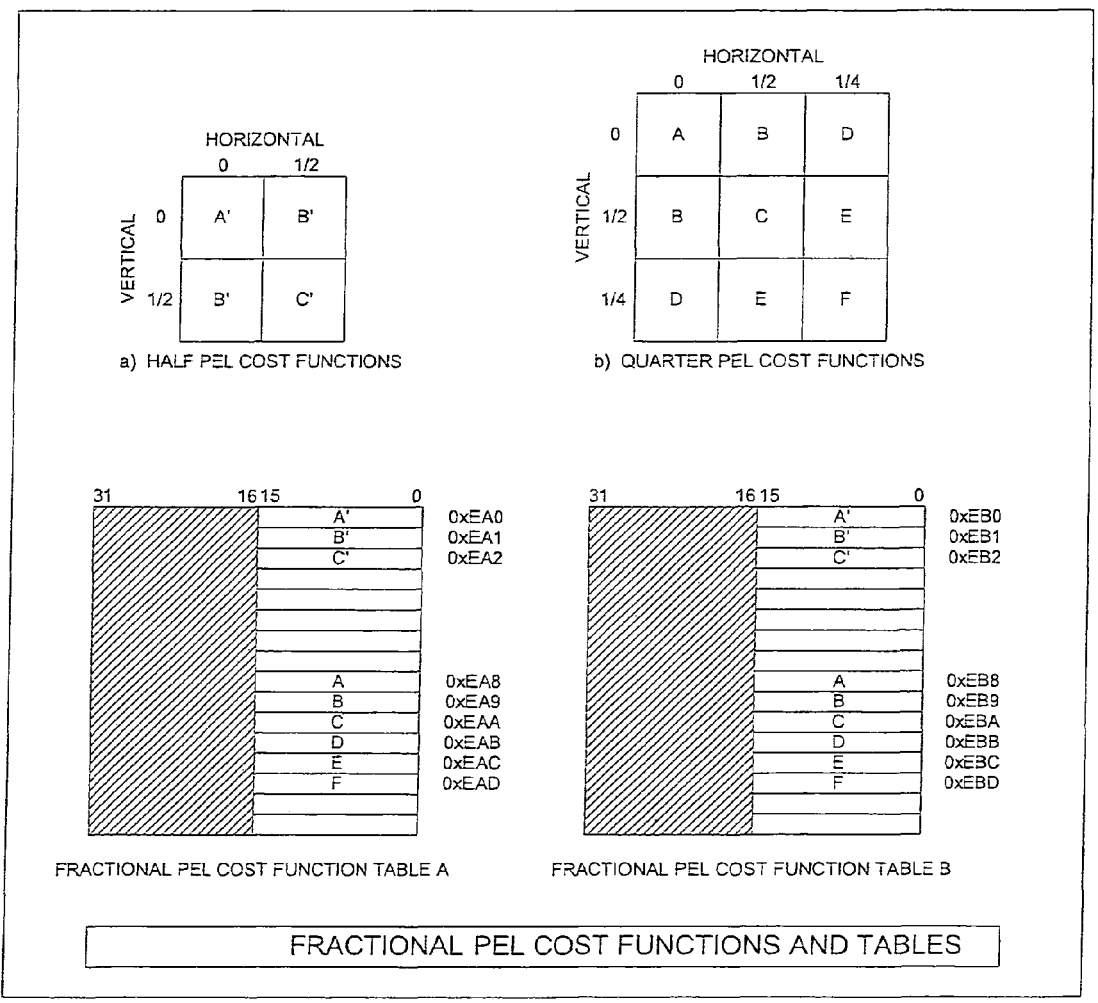
FIG. 27 shows formats for fractional PEL cost functions and tables according to an embodiment of the invention.

In each vertical cost function table, two 16 bit integers, a pair of vertical cost functions, are packed in each 32 bit longword in the table. The cost functions for rows 0 and 1 are stored at table location 0, the cost functions for rows 2 and 3 are stored at table location 1, and so on. Cost functions for even numbered rows are stored in bits [15:0] of the longword; cost functions for odd numbered rows are stored in bits [31:16] of the longword. Fractional PEL cost functions and Cost Function Tables A and B are shown in FIG. 27.

Reference Block Overview: As shown in FIG. 23, two 3840 byte reference block buffers are allocated in DVN node memory. Each buffer is stored in four physical memories to allow access to 16 PEL each clock period. We will employ a numbering convention that is referenced to the upper left PEL, whose (H) horizontal and (V) vertical coordinates will be designated (H:0, V:0). The upper left PEL of reference block A will be stored in the high order byte of memory location 0x000; and the upper left PEL of reference block B will be stored in the high order byte of memory location 0x100. Rows 0, 4, 8, ... of the reference block will be stored in memory 0; rows 1, 5, 9, ... will be stored in memory 1; rows 2, 6, 10, ... will be stored in memory 2; and rows 3, 7, 11, ... . will be stored in memory 3.

Figure 28:
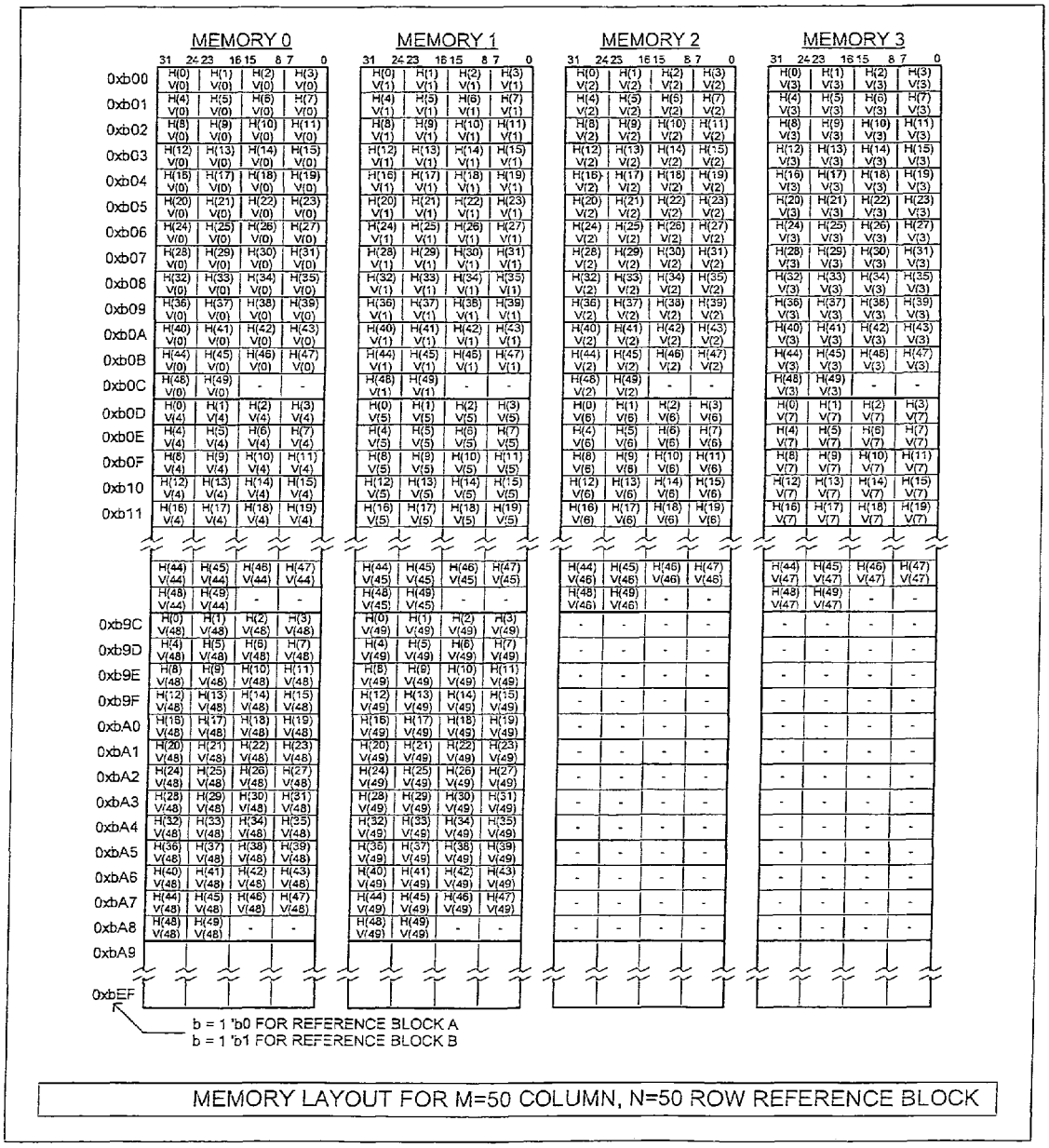
FIG. 28 shows a memory layout for a reference block having M=50 columns and N=50 rows according to an embodiment of the invention.
Figure 29:
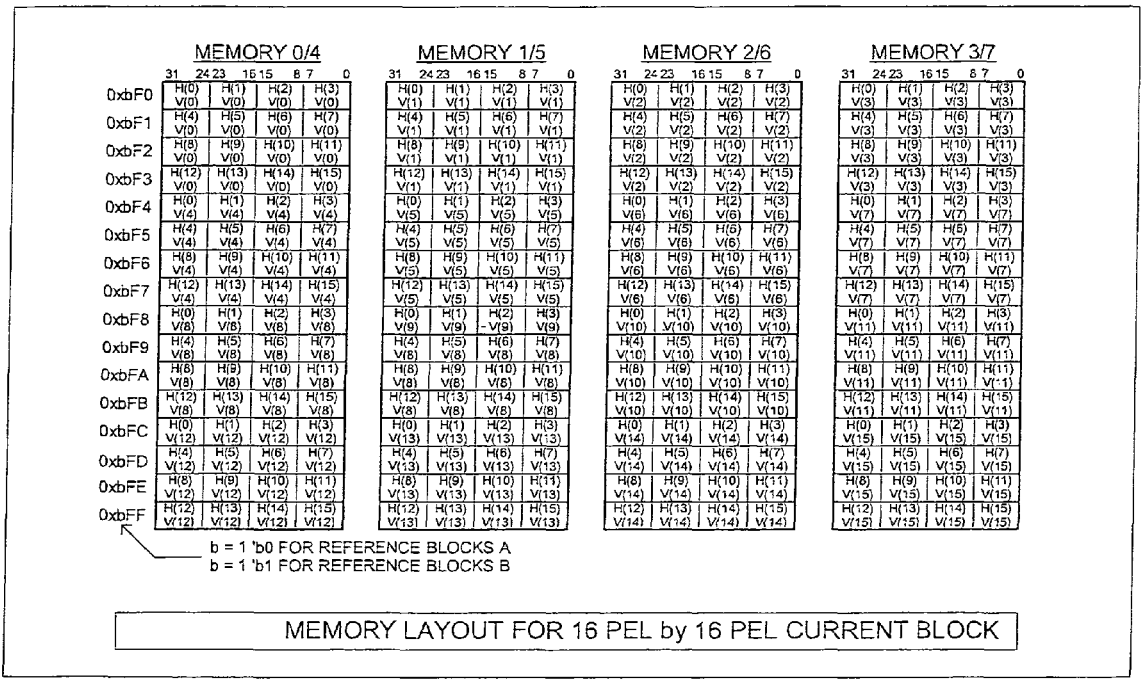
FIG. 29 shows a memory layout for a current block of size 16 PELs by 16 PELs according to an embodiment of the invention.

An M=50 column by N=50 row reference block will be stored in node memories 0 through 3 as shown in FIG. 28. Each 16 PEL by 16 PEL current block will be stored in node memories 0 through 3, and also in node memories 4 through 7, as shown in FIG. 29.

Figure 30:
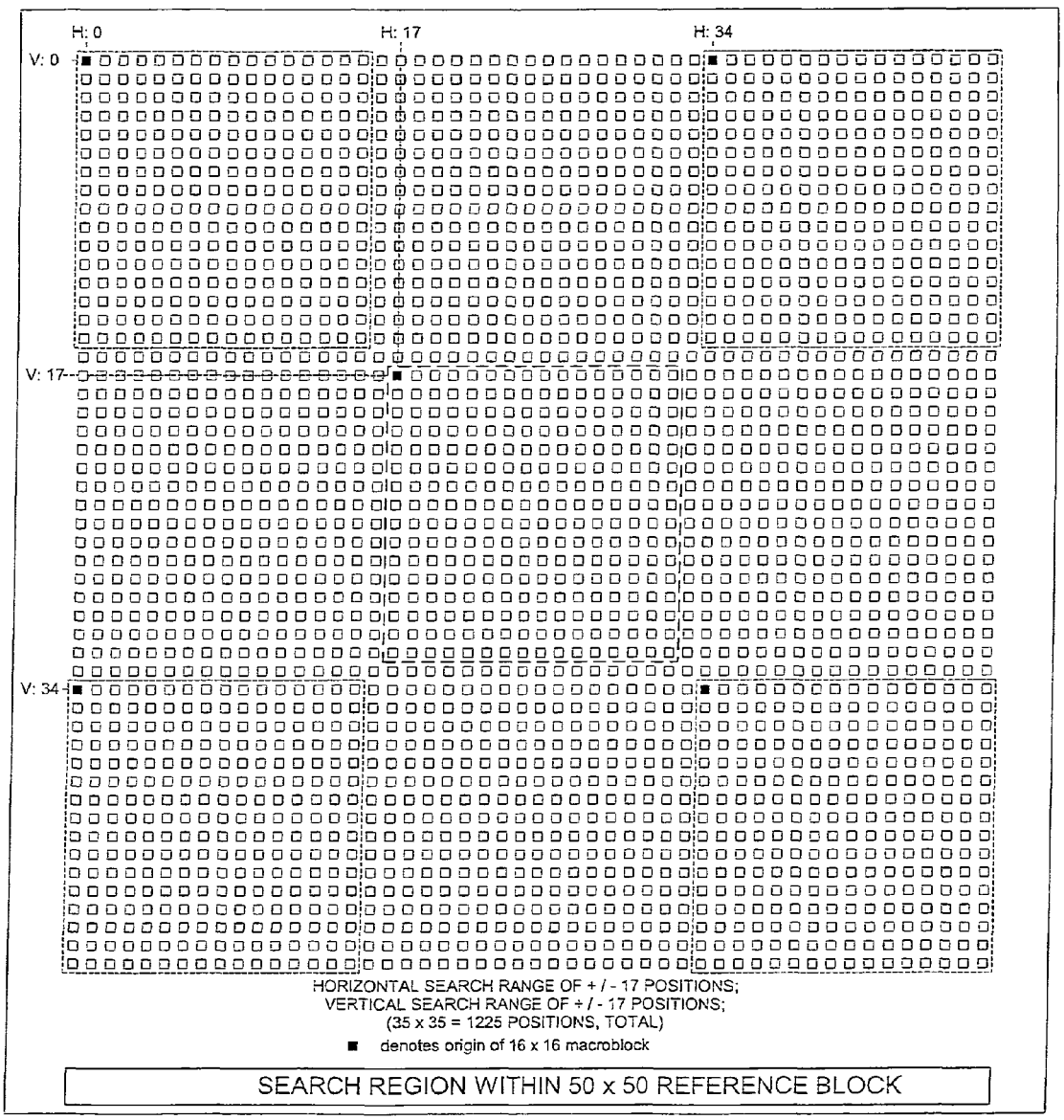
FIG. 30 shows a search region within a 50 by 50 reference block according to an embodiment of the invention.

The 50 PEL by 50 PEL reference block allows for a search range of +/−17 PEL in each dimension (referenced to the center search position at ([H: 17,V:17]) as shown in FIG. 30. There are 1225 candidate search positions within a 50 PEL by 50 PEL reference block. The 'center' position, with relative coordinates H(17), V(17), is shown in FIG. 30. Five search positions are highlighted in FIG. 30: the center position, H(17), V(17); the upper-leftmost position, H(0), V(0); the upper rightmost position, H(34), V(0); the lower leftmost position, H(0), V(34); and the lower rightmost position, H(34), V(34).

Figure 31:
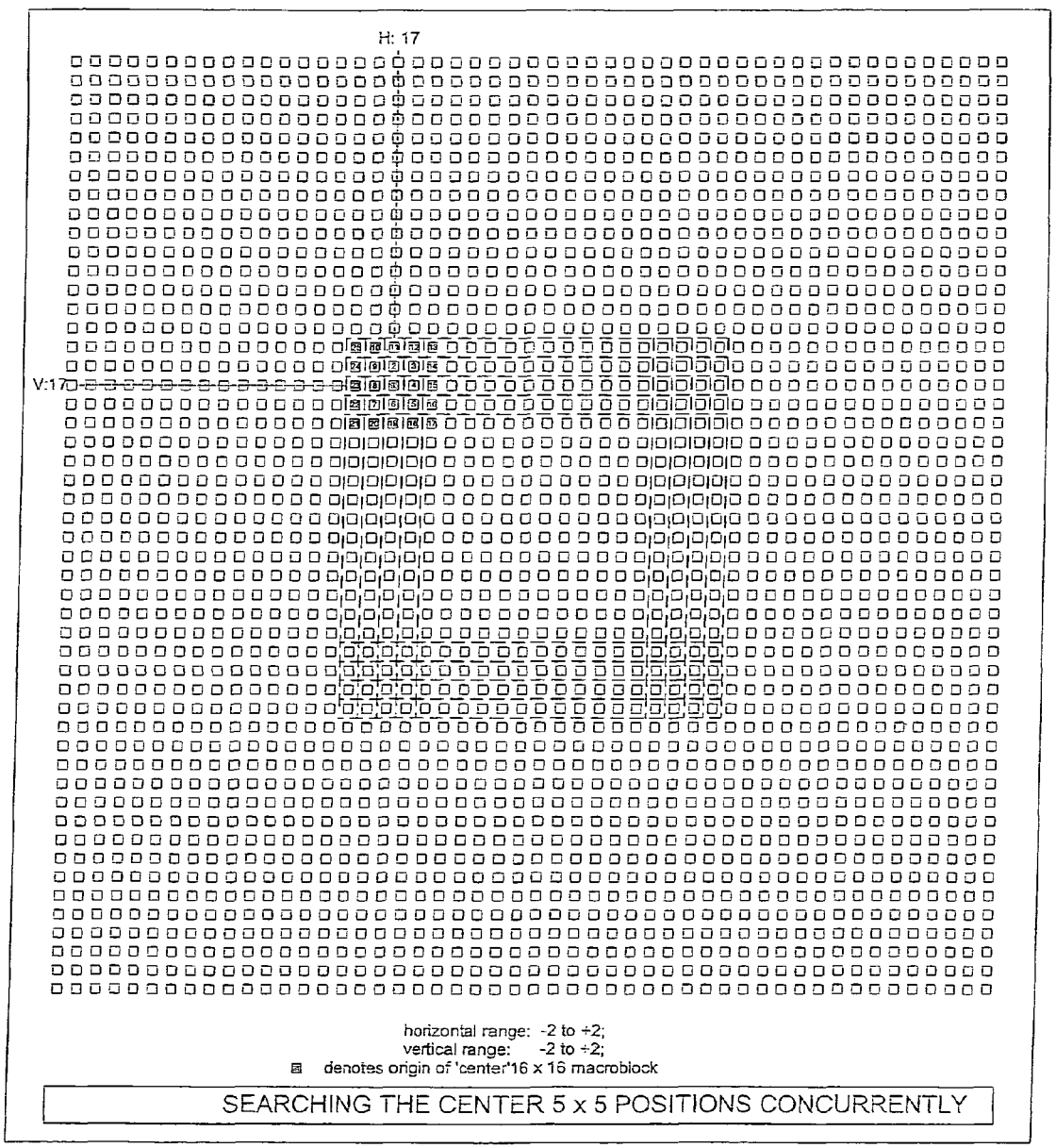
FIG. 31 shows a process of searching the center 5 by 5 positions concurrently according to an embodiment of the invention.
Figure 32:
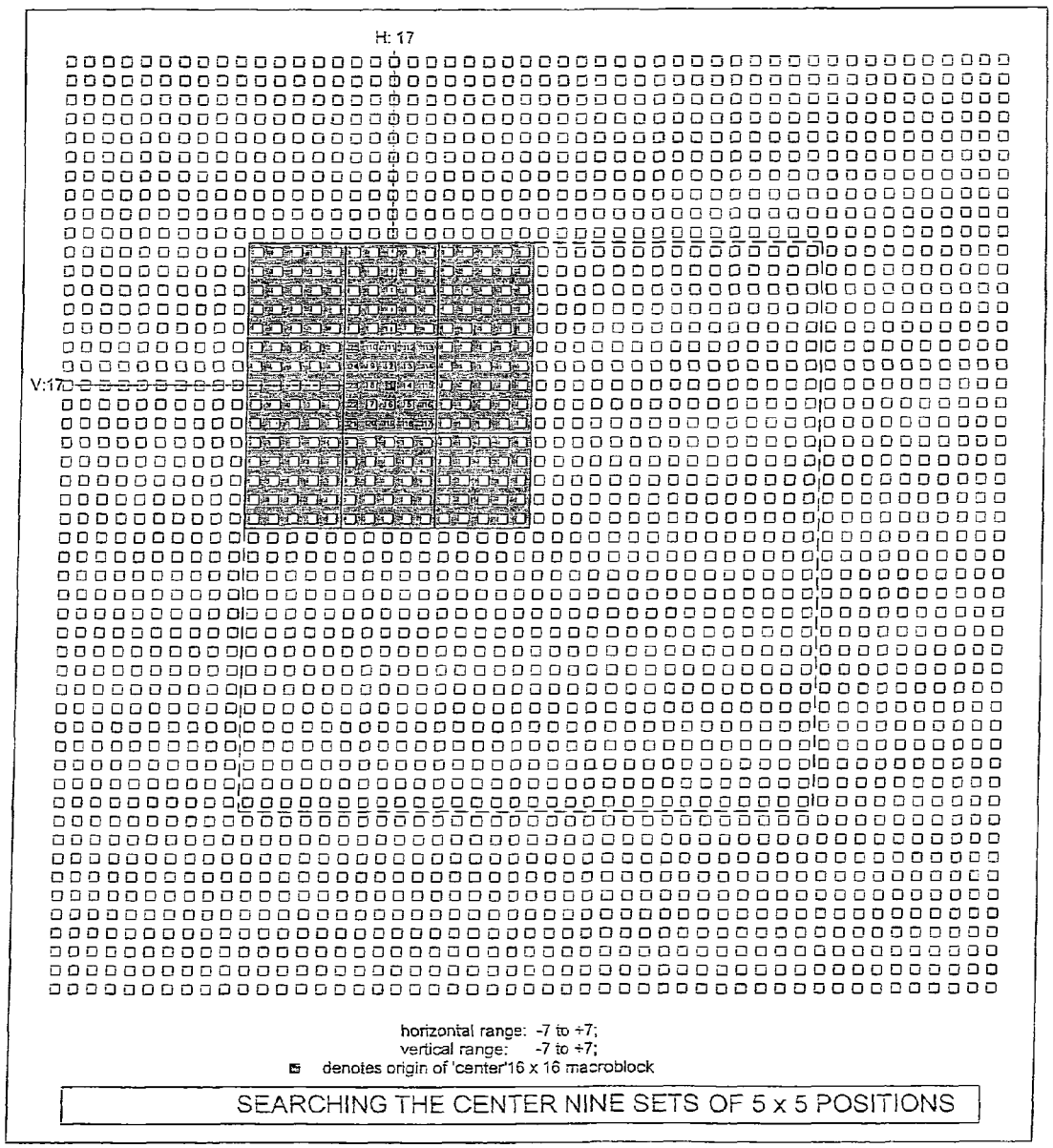
FIG. 32 shows a process of searching the center 9 sets of 5 by 5 positions concurrently according to an embodiment of the invention.
Figure 33:
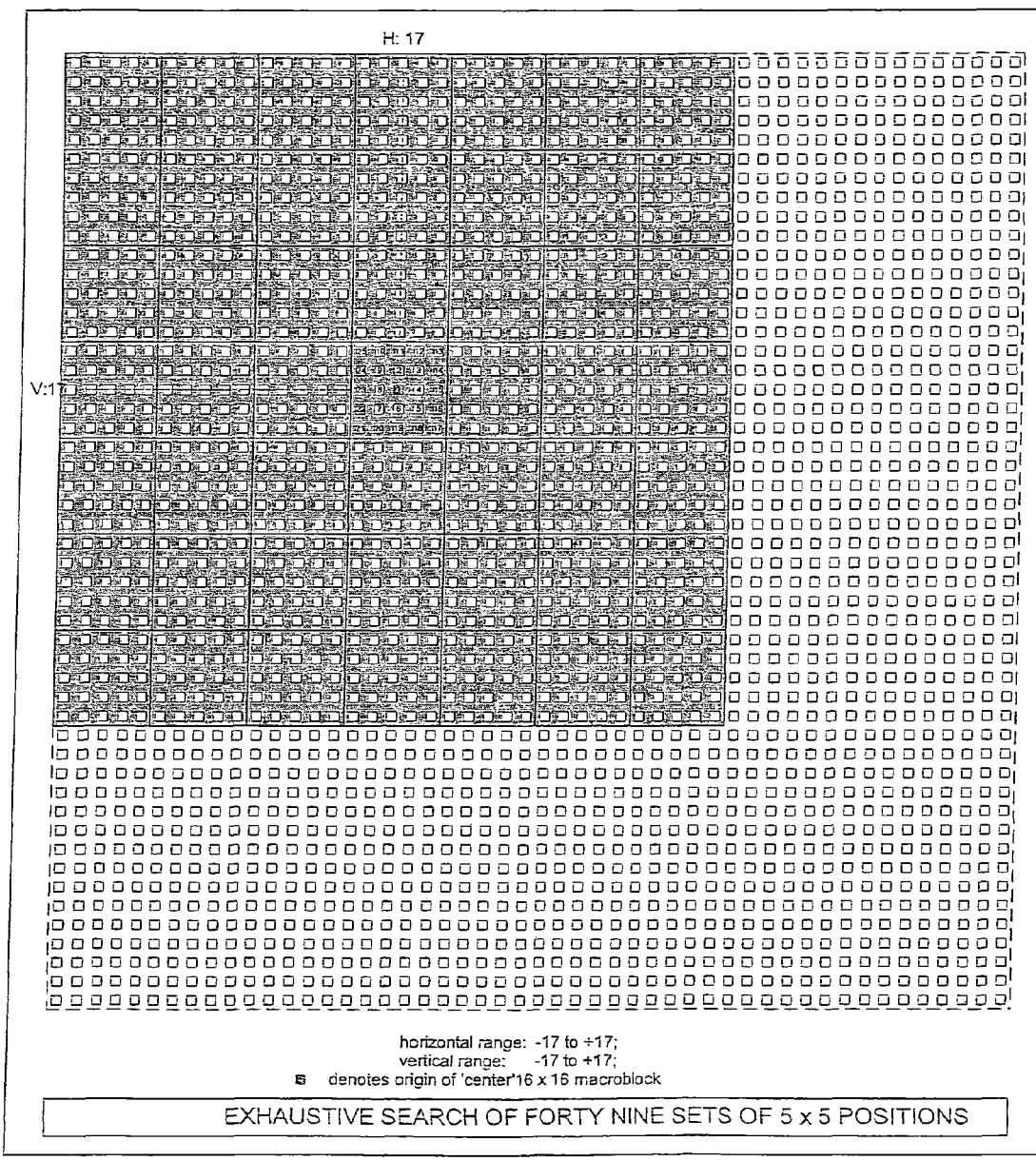
FIG. 33 shows a process of exhaustive search of forty nine sets of 5 by 5 positions according to an embodiment of the invention.
Figure 34:
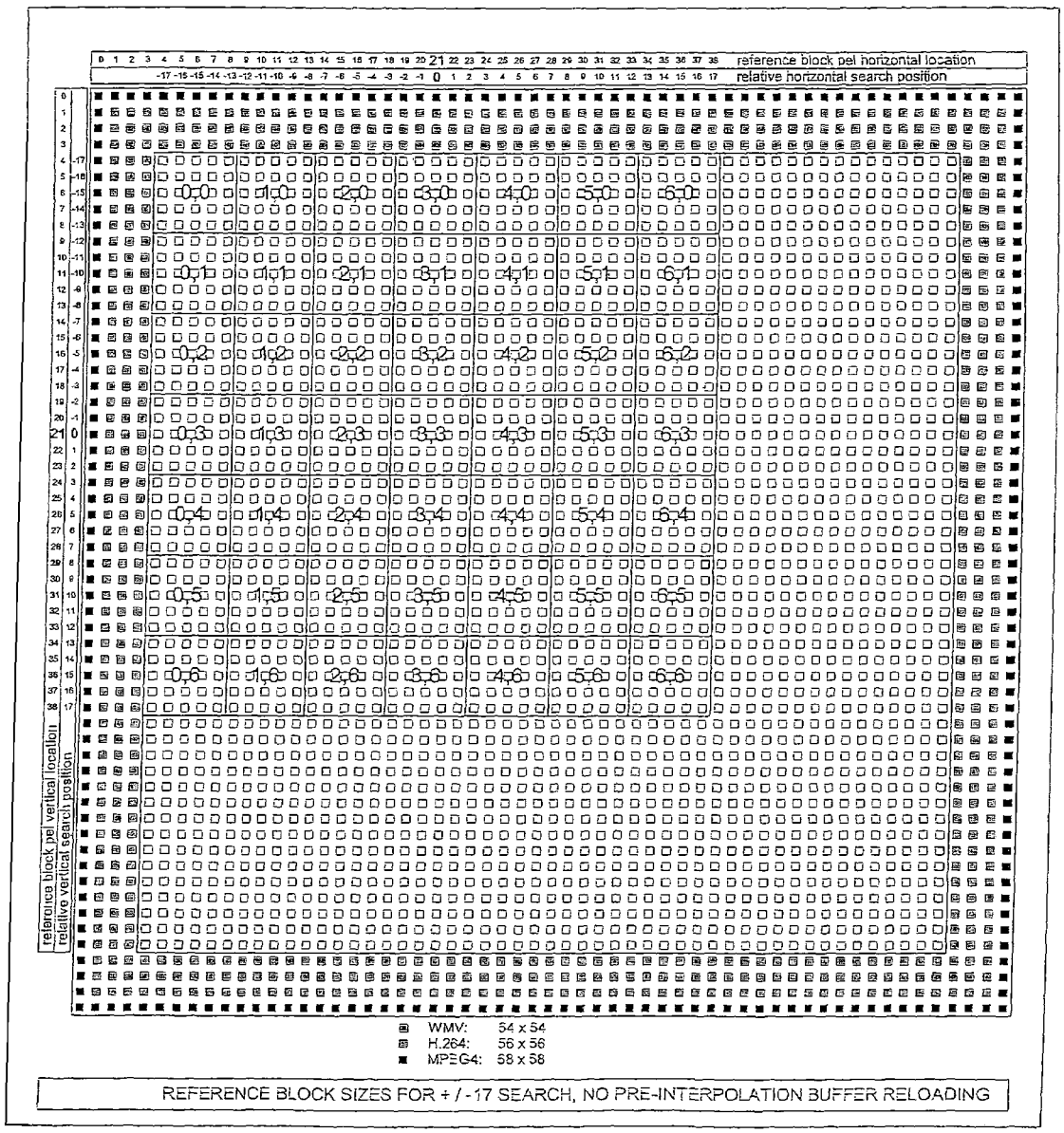
FIG. 34 shows reference block sizes for plus/minus 17 search, without reloading of the pre-interpolation buffer, according to an embodiment of the invention.

Searching the center 5×5 positions currently within such a reference block is shown in FIG. 31. In this case, the total number of positions searched is 25, and the search range is +/−2 PEL in each dimension. Searching the center nine sets of 5×5 positions within such a reference block is shown in FIG. 33. In this case, the total number of positions searched is 9×5×5=225 and the search range is: +/−7 PEL in each dimension. Exhaustively searching all 49 sets of 5×5 positions within such a reference block is shown in FIG. 34. In this case, the total number of positions searched is 49×5×5=1225, and the search range is: +/−17 PEL in each dimension.

Figure 35:
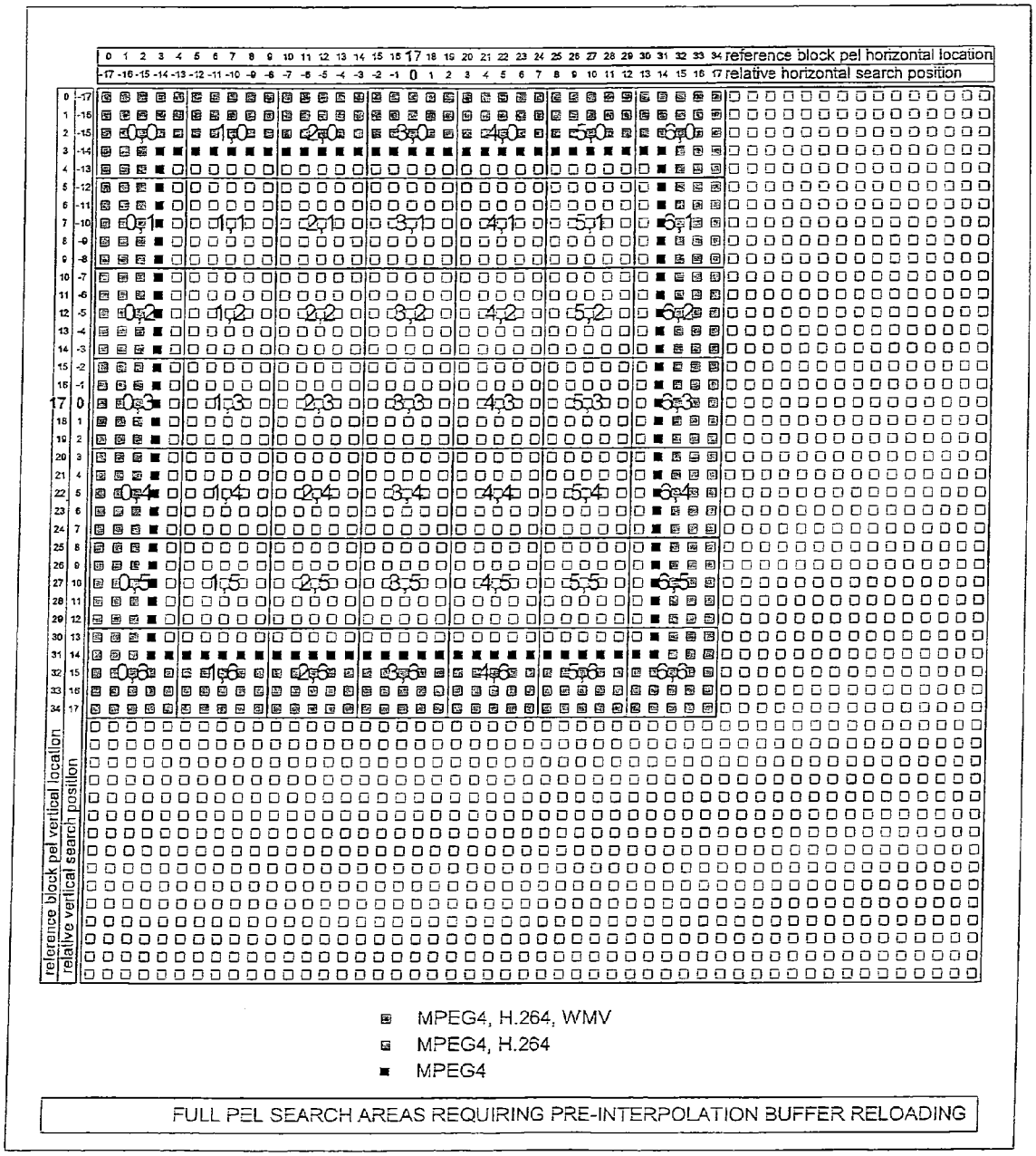
FIG. 35 shows full PEL search areas that require pre-interpolation buffer reloading according to an embodiment of the invention.
Figure 36:
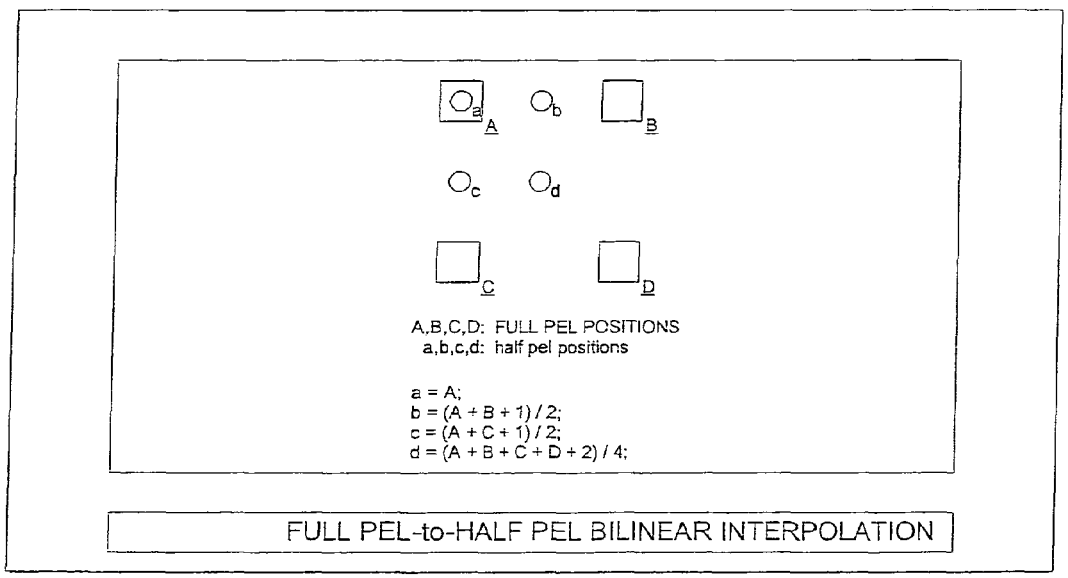
FIG. 36 shows full PEL to half PEL bilinear interpolation according to an embodiment of the invention.
Figure 37:
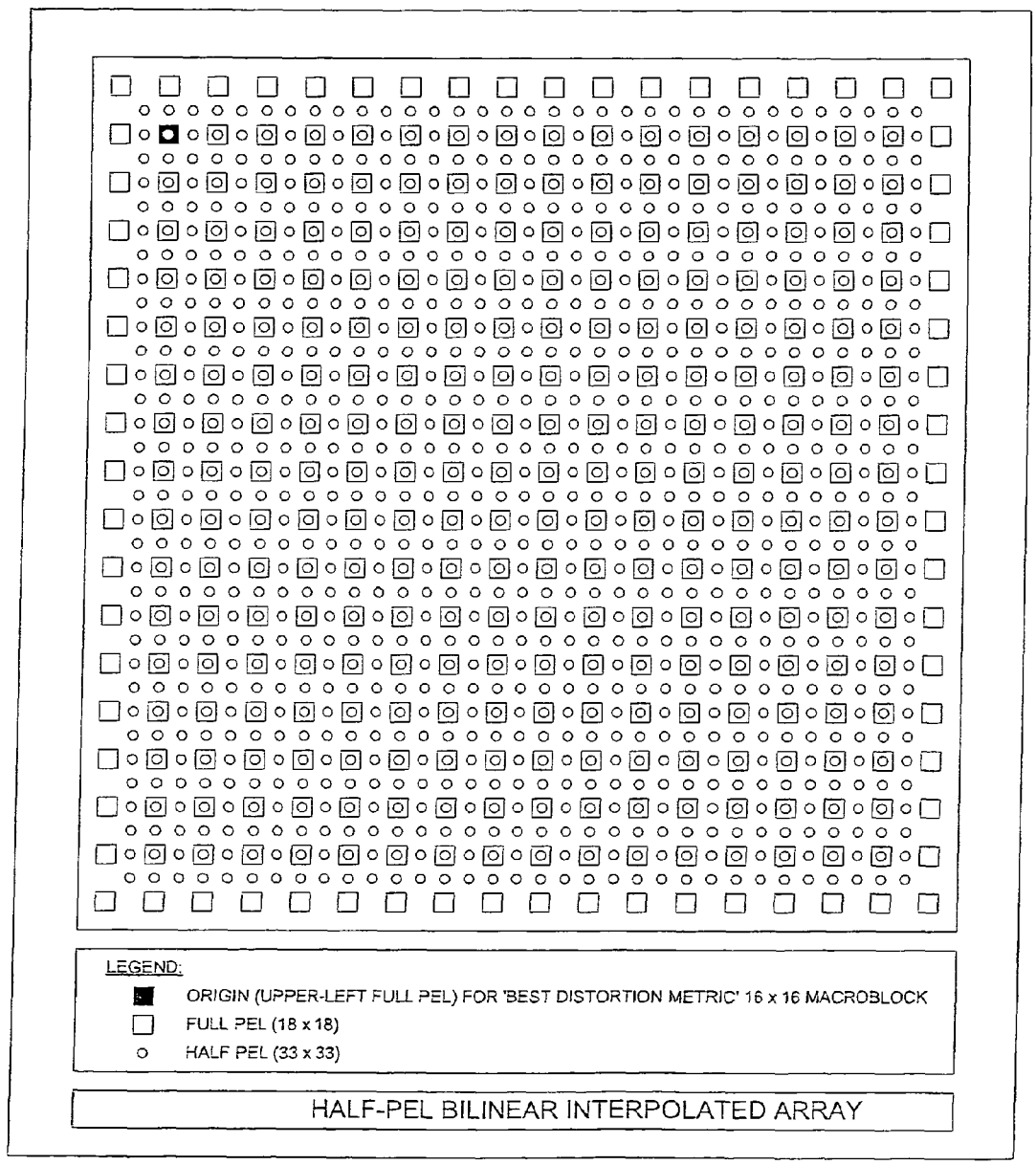
FIG. 37 shows a half-PEL bilinear interpolated array according to an embodiment of the invention.

When fractional PEL processing is included, the programmer may select between two strategies:

Load an 'oversized' reference block with a sufficient number of PEL to support interpolation for any search outcome. The size of such an 'oversized' reference block can be determined by the size of the current macroblock (m), the search range (h, v) and the number of taps (n) for the half PEL interpolation filter. Specifically, the size will be [m+h+n−1] horizontal PEL by [m+v+n−1] vertical PEL. For example, for a 16×16 PEL macroblock, +/−17 PEL search range horizontally and vertically, and an H.264 6-tap interpolation filter, the reference block must be 56×56 PEL, (3136 bytes) as shown in FIG. 35.

Load a reference block with the minimum number of PEL consistent with the desired search range. The size of such a reference block can be determined by the size of the current macroblock (m) and the search range (h, v). Specifically, the size will be [m+h−1] horizontal PEL by [m+v−1] vertical PEL. For example, for a 16×16 PEL macroblock and a +/−17 PEL search range horizontally and vertically, the reference block will be 50×50 PEL (2500 bytes), considerably smaller than the 3136 bytes required for strategy 1), above. Then, if the search outcome requires, reload the reference block buffer with [m+n] horizontal PEL by [m+n] vertical PEL before proceeding with the interpolation step. This is summarized in FIG. 36.

Full PEL Search: The DVN supports two modes of operation for full PEL search. One mode evaluates an arbitrary 16×16 position within the reference block, performing 16 SAD operations every clock period. The second mode evaluates m-by-n sets of (5×5=25) positions concurrently, performing 200 maximum (160 average) SAD operations every clock period. For both modes, 'evaluation' consists of calculating the 'sum of absolute differences' (SAD) metric between the current 16×16 macroblock and any 16×16 macroblock within the reference block plus a horizontal cost function plus a vertical cost function, always saving the best metric and the origin of the associated 16×16 macroblock. The search pattern is governed by instruction sequences that are written by a controlling PSN node into one of two command queues in DVN memory. Unique command codes for each queue entry indicate whether a single position or m-by-n 5×5 positions should be evaluated for a given (X,Y) origin.

Figure 38:
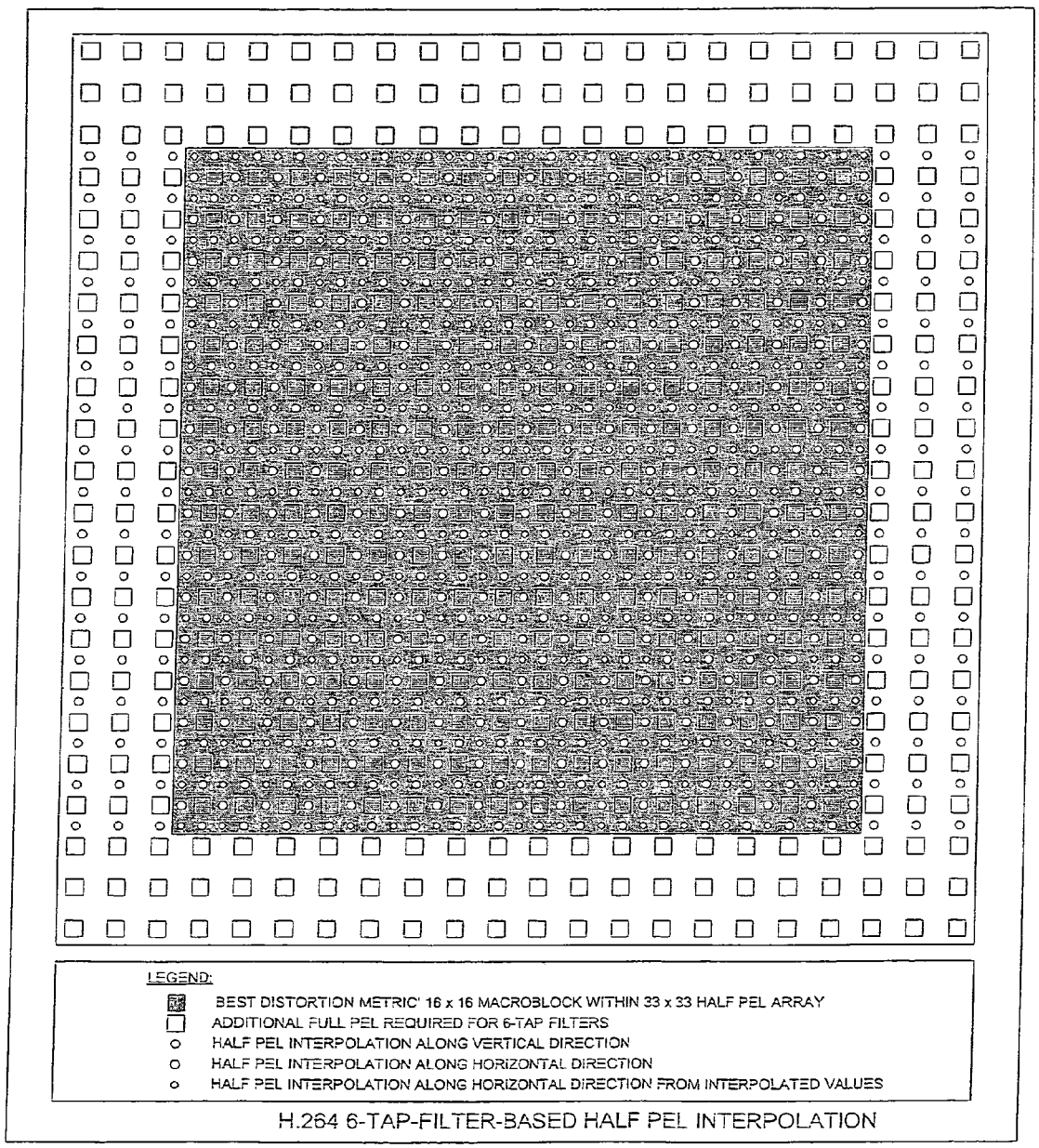
FIG. 38 shows a 6-tap-filter-based half PEL interpolation for H.264 video according to an embodiment of the invention.
Figure 39:
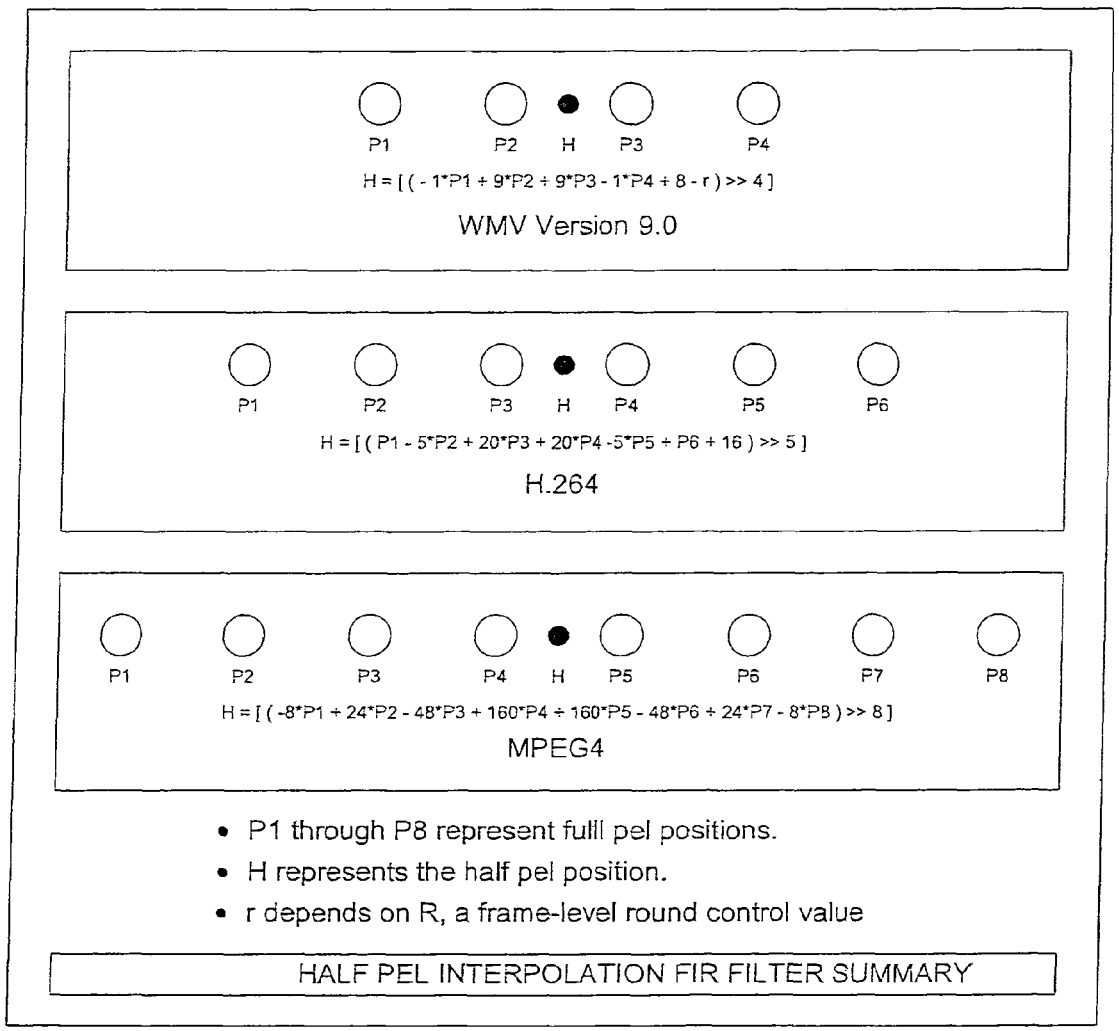
FIG. 39 shows a summary of a half PEL interpolation finite impulse response (FIR) filter according to an embodiment of the invention.
Figure 40:
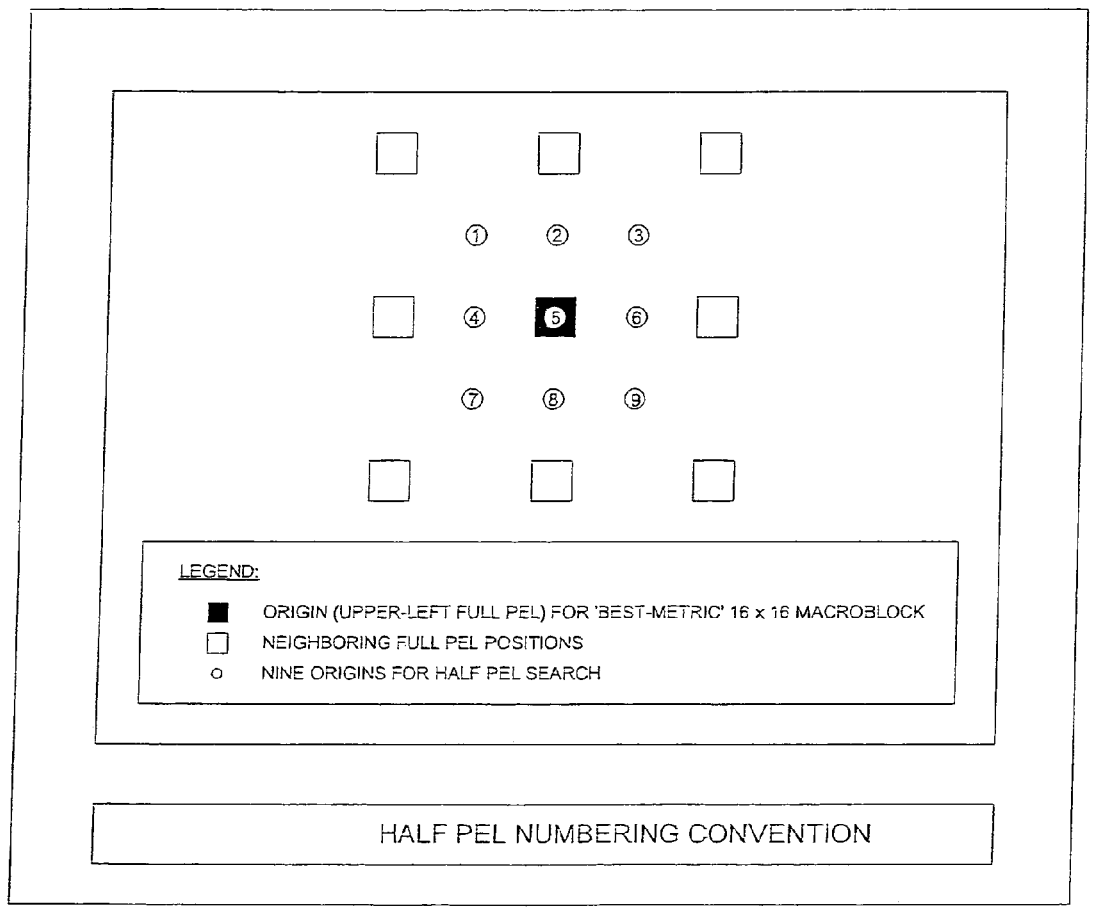
FIG. 40 shows a half PEL numbering convention according to an embodiment of the invention.

Half PEL Interpolation: After full PEL search for the 16×16 macroblock with the best distortion metric, half PEL interpolation is performed on the surrounding ([16+n]×[16+n]) PEL array, where n is the filter order. For bilinear interpolation, WMV, H.264, and MPEG4, n=2, 4, 6, and 8, respectively. The calculations required for half PEL bilinear interpolation are summarized in FIG. 37. The 33×33 half PEL array that results from bilinear interpolation of the 18×18 full PEL array associated with the 'best metric' 16×16 macroblock is shown in FIG. 38. The 33×33 half PEL array that results from H.264 6-tap filter interpolation is shown in FIG. 39. A summary of supported half PEL interpolation FIR filters is shown in FIG. 40. For the half PEL positions of ½ PEL-horizontal-shift and ½ PEL-vertical-shift, the same filters are used on the full PEL, ½ PEL interpolated values, maintaining the full precision of these values.

Half PEL Search: After half PEL interpolation using one of the four filtering options, the half PEL metrics are calculated for each of nine candidate half PEL positions. The metric is the sum of the SAD256 metric plus the half PEL cost function. A numbering convention for the nine candidate half PEL positions is shown in FIG. 41. Note from the figure that the full PEL metric for the full PEL position (position '5') has been calculated previously. However, the half PEL metric for position '5' will be the its full PEL metric, minus its full PEL horizontal and vertical cost functions, plus its half PEL cost function for this position (see FIG. 27). Half PEL search consists of generating the metric of SAD+half PEL cost function for each of the nine candidates and selecting the one that has the best metric.

Figure 42:
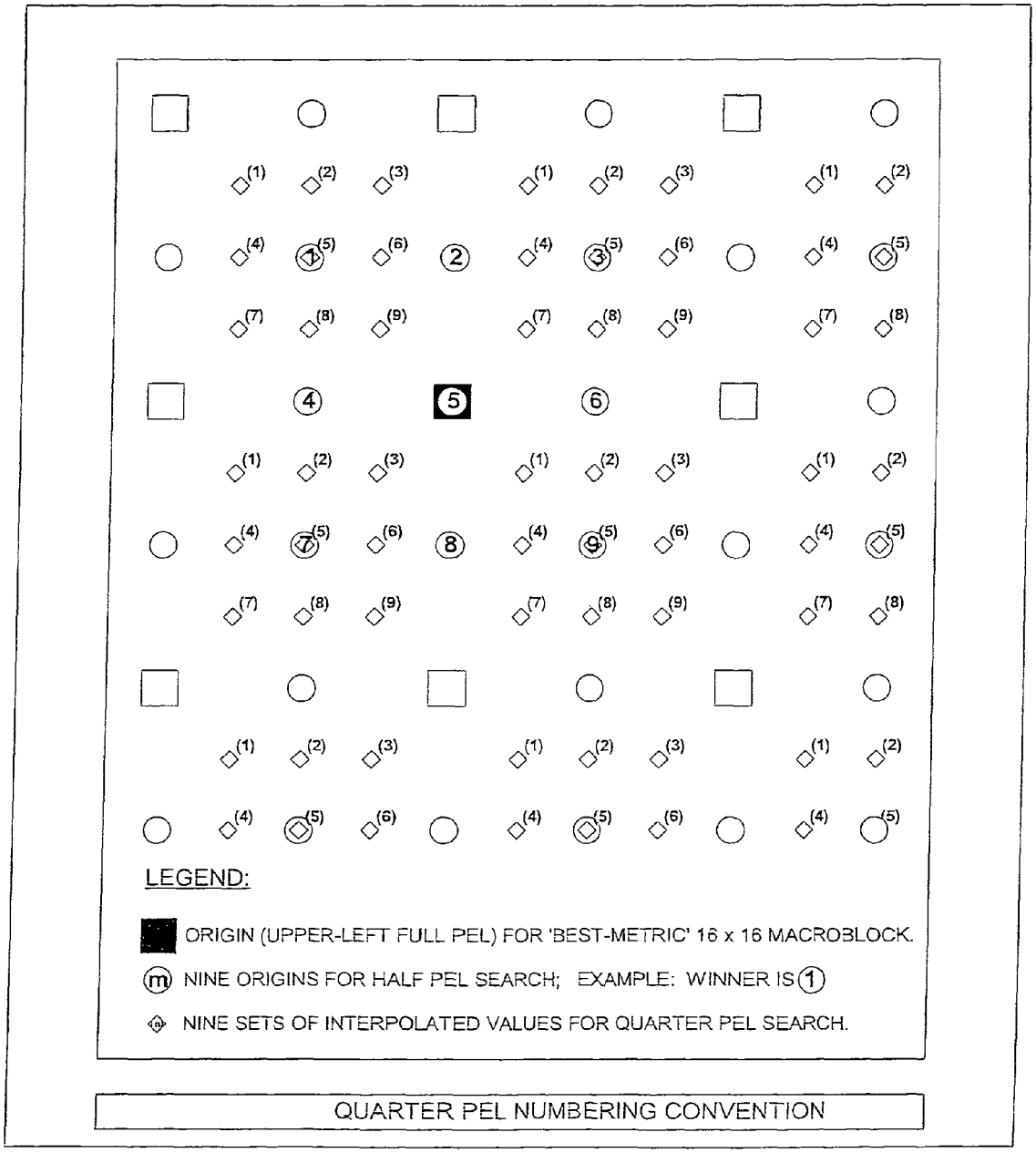
FIG. 42 shows a quarter PEL numbering convention according to an embodiment of the invention.

Quarter PEL Interpolation: After half PEL search for the 16×16 macroblock with the best distortion metric, quarter PEL interpolation is performed on the surrounding ([16+n]×[16+n]) PEL array, where n is the filter order. For WMV, n=4; for H.264, and MPEG4, which use bilinear interpolation, n=2. The WMV sub-PEL four tap FIR filters for the ¼ PEL position, the ½ PEL position, and the ¾ PEL position are summarized in FIG. 42.

Quarter PEL Search: After quarter PEL interpolation, the quarter PEL metrics are calculated for each of nine candidate quarter PEL positions. The metric is the sum of the SAD256 metric plus the quarter PEL cost function. A numbering convention for the nine candidate quarter PEL positions is shown in FIG. 43. Note from the figure that only nine-of-16 quarter PEL positions must be calculated. Note, too, that one metric for the nine candidate quarter PEL positions (position '5') has been calculated previously. However, the quarter PEL metric for position '5' will be its half PEL metric, minus its half PEL cost function, plus its quarter PEL cost function for this position (see FIG. 27). Quarter PEL search consists of generating the metric of SAD+quarter PEL cost function for each of the nine candidates and selecting the one that has the best metric.

Macroblock Signed Differences: The DVN also will be capable of calculating and outputting a 256 element array of 9-bit signed differences between any 16 PEL by 16 PEL macroblock in DVN node memory (full PEL, half PEL, or quarter PEL) and either 16 PEL by 16 PEL current block in DVN node memory. The array is output to a destination node as 128 longwords, where each longword is a packed pair of 16-bit signed integers representing the sign-extended 9-bit signed differences of the 16×16 macroblocks.

Summary of Programming Issues Related to the DVN: Referring to FIG. 13, the following are programming requirements for the DVN: construct and load the task parameter list (TPL) into DVN node memory; construct and load the byte code into DVN node memory; configure the DVN hardware task manager (HTM); direct the Data Mover to construct and transfer to DVN node memory the requisite reference blocks, current blocks, and cost function tables, along with the appropriate data flow acknowledgements; construct and transfer the requisite command queue instruction sequences to DVN node memory; configure the HTM in the DVN's controller node to support its processing of messages from the DVN; and configure DVN destination nodes (consumers) to receive output from the DVN and to send to the DVN the appropriate data flow acknowledgements.

DVN Hardware Overview: A simplified block diagram of the DVN execution unit is shown in FIG. 44. The DVN includes the QST Node Wrapper, eight 2 KB node memories (each organized as 512 words by 32 bits), and an execution unit (EU), consisting of an overhead processor (OHP) and a motion estimation engine (ME). The ME performs full PEL/half PEL/quarter PEL search, half PEL and quarter PEL interpolation, and macroblock signed differences. It outputs the best metric and the origin of the associated 16×16 macroblock to the controller node and a destination node; it outputs the associated 16×16 macroblock to a destination node performing the decoder motion compensation function; and it can output macroblock signed differences to a destination node.

Features of the DVN include: separate control units for the motion estimation engine and the overhead processor for maximum efficiency; compact byte code and efficient TPL load/store operation to minimize overhead for setup, ACK+TEST, and continue; finite state machine (FSM) based PLA control of motion estimation engine for superior power/area metrics compared with sequencer+control memory-based implementations; innovative algorithm implementations for enhanced performance and reduced power; eight physical memory block architecture to allow massive parallelism; and high-performance memory interfaces with 'same write address/read address' resolution.

The motion estimation engine includes several functional elements: control program unit (CPU); memory address generator unit (AGU); data path unit (DPU); sum of absolute differences (SAD), signed differences; multi-format sub-PEL interpolation; wrapper interface unit (WIU); and memory interface unit (MIU)

The DVN performs the following operations: 1) full PEL search over (up to) 80 PEL in the horizontal dimension and (up to) 50 PEL in the vertical dimension; 2) full PEL to 35×35 half PEL interpolation using one of four (perhaps more) filters; 3) half PEL search; 4) 35×35 half PEL to nine×16×16 quarter PEL interpolation; 5) quarter PEL search; and 6) output best metric and origin of the associated 16×16 macroblock to the controlling PSN node, and output 16×16 macroblock itself to the node performing decoder motion compensation; 7) calculate and output the 256 signed differences between a selected 16×16 macroblock (full PEL, half PEL, or quarter PEL) and the current 16×16 macroblock.

Each of eight node memories is partitioned into a ping pong buffer pair to allow fully overlapped data input and computation/results output. After one data set has been transferred from the Data Mover to the eight DVN memories, the DVN ME performs its calculations and outputs its results. During this time, the next data set is transferred from the Data Mover to the eight DVN memories. And so on.

Each data set includes a variably sized reference block, a 16×16 PEL array (current block) and fractional PEL cost function tables. These data are distributed among the eight node memories in a manner that optimizes the ME's access to the data. Generally, this includes access to four bytes of data from each of eight node memories every clock period. This allows sixteen SAD operations to be performed each clock period when one 16×16 search position is evaluated at a time. Additionally, for 'twenty five concurrent search positions' mode, it allows access to data from four rows of the reference block and data from four rows of the current block every clock period.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/FIGs. should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A system for processing video data, comprising:
   a reconfigurable digital video processor configured to perform motion estimation on a sequence of frames, wherein performing motion estimation includes comparing a block of picture elements (PELs) associated with a current frame with a block of PELs associated with a frame before the current frame or with a block of PELs associated with a frame subsequent to the current frame to identify the block of PELs with the lowest distortion, the comparison including performing a plurality of sum of absolute differences (SAD) operations, wherein the reconfigurable digital video processor includes heterogeneous processing nodes connected by a matrix interconnect network;

a control processor configured to provide instructions to the reconfigurable digital video processor that dynamically configure the heterogeneous processing nodes and the matrix interconnect network included in the reconfigurable digital video processor to receive input video data associated with a first format and to generate output video data associated with a second format, wherein the instructions include information related to the first format associated with the input video data and the second format associated with the output video data, wherein the instructions include information related to both the first format and a first resolution of the input video data as well as the second format and a second resolution of the output video data, and wherein the instructions further include degree of compression information; and a plurality of memories for storing the blocks of PELs associated with each frame to enable multiple SAD operations to be performed during each clock cycle, wherein the plurality of memories includes eight node memories that allow for sixteen SAD operations to be performed during each clock cycle, wherein the eight node memories are configured to enable double buffering for overlapping data input and results output, wherein the reconfigurable digital video processor is further configured to evaluate each block of PELs by pixel positions, one at a time, performing SAD operations every clock period, each of the evaluations including calculating the SAD metric between a first block of PELs and a second block of PELs, wherein the second block of PELs is included in a larger reference block of which the first block of PELs is a part, and saving a best distortion metric and an origin of the second block of PELs associated with the best distortion metric.

2. A system as claimed in claim 1, wherein the reconfigurable digital video processor is further configured to perform a bilinear interpolation on a PEL array surrounding the second block of PELs associated with the best distortion metric.

3. A system as claimed in claim 2, wherein the reconfigurable digital video processor is further configured to calculate a SAD metric for each of a plurality of half PEL positions after performing the bilinear interpolation.

4. A system as claimed in claim 1, wherein the control processor is further configured to dynamically configure the reconfigurable digital video processor to perform the motion estimation using a particular number of regions within a set of regions within video data and a relative offset among regions within the set of regions.

* * * * *